(12) United States Patent
Pulvirenti

(10) Patent No.: US 11,929,674 B2
(45) Date of Patent: Mar. 12, 2024

(54) VOLTAGE MULTIPLIER CIRCUIT

(71) Applicant: STMicroelectronics S.r.l., Agrate Brianza (IT)

(72) Inventor: Francesco Pulvirenti, Acireale (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/732,281

(22) Filed: Apr. 28, 2022

(65) Prior Publication Data

US 2022/0393579 A1  Dec. 8, 2022

(30) Foreign Application Priority Data

May 12, 2021  (IT) .................. 102021000012167

(51) Int. Cl.
*H02M 3/07* (2006.01)

(52) U.S. Cl.
CPC ..................... *H02M 3/07* (2013.01)

(58) Field of Classification Search
CPC ........ H02M 3/07; H02M 3/076; H02M 3/073; H02M 1/0043; H02M 1/0095; H02M 7/103
See application file for complete search history.

(56) References Cited

U.S. PATENT DOCUMENTS 3,845,331 A   10/1974  Luscher
5,874,850 A    2/1999  Pulvirenti et al.

8,817,501 B1 *  8/2014  Low ................ H02M 3/073
                                          363/59
10,461,635 B1 * 10/2019  Din .................. H02M 3/07
2003/0184360 A1 10/2003  Wang et al.
2007/0285150 A1* 12/2007  Racape ............. H02M 3/073
                                          327/536

(Continued)

FOREIGN PATENT DOCUMENTS

EP   0696839 A1   2/1996
EP   3355459 A1   8/2018

OTHER PUBLICATIONS

Atsumi, S. et al., "A 16-Mb flash EEPROM with new self-data-refresh scheme for a sector erase operation," IEEE J. Solid-State Circuits, vol. 29, No. 4, Apr. 1994, 9 pages.

(Continued)

*Primary Examiner* — Sibin Chen
(74) *Attorney, Agent, or Firm* — Slater Matsil, LLP

(57) ABSTRACT

In an embodiment, a voltage multiplier comprises an input node, an output node, and first and second control nodes for receiving first and second clock signals defining two commutation states. An ordered sequence of intermediate nodes is coupled between the input and output nodes and includes two ordered sub-sequences. Capacitors are coupled: between each odd intermediate node in the first sub-sequence and the first control node; between each even intermediate node in the first sub-sequence and the second control node; between each odd intermediate node in the second sub-sequence and a corresponding odd intermediate node in the first sub-sequence; and between each even intermediate node in the second sub-sequence and a corresponding even intermediate node in the first sub-sequence. The circuit comprises selectively conductive electronic components coupled to the intermediate nodes.

20 Claims, 13 Drawing Sheets

(56) References Cited

U.S. PATENT DOCUMENTS

2022/0393579 A1* 12/2022 Pulvirenti ............. H02M 3/073

OTHER PUBLICATIONS

Berkhout, M. et al., "A low-ripple chargepump circuit for high voltage applications," ESSCIRC '95: Twenty-first European Solid-State Circuits Conference, Sep. 19, 1995, 4 pages.

Brugler, J.S., "Theoretical performance of voltage multiplier circuits," IEEE Journal of Solid-State Circuits, Jun. 1971, 4 pages.

Calligaro, C. et al., "Positive and negative CMOS voltage multiplier for 5-V-only flash memories," 38th Midwest Symposium on Circuits and Systems Proceedings, Aug. 6, 2002, 4 pages.

Calligaro, C. et al., "Voltage multiplier with output stabilization," 38th Midwest Symposium on Circuits and Systems Proceedings, Aug. 6, 2002, 4 pages.

Cockcroft, J.D. et al., "Experiments with High Velocity Positive Ions.—(I) Further Developments in the Method of Obtaining High Velocity Positive Ions," Proc. Roy. Soc., A, vol. 136, Feb. 23, 1932, 13 pages.

Dickson, J.F., "On-chip high-voltage generation in MNOS integrated circuits using an improved voltage multiplier technique," IEEE J. Solid-State Circuits, vol. SC-11, Jun. 1976, 5 pages.

Gariboldi, R. et al., "A 70 mohm intelligent high side switch with full diagnostics, " IEEE J. Solid-State Circuits, vol. 31, No. 7, Jul. 1996, 4 pages.

Gariboldi, R. et al., "A monolithic quad line driver for industrial applications," IEEE J. Solid-State Circuits, vol. 29, No. 8, Aug. 1994, 4 pages.

Gasparini, F. et al., "On the Operation of Voltage Multipliers to Rectifiers and Capacitors," Eletrotecnica, vol. 46, No. 11, Nov. 1959, 24 pages.

Gerber B. et al., "A 1.5 V single-supply one-transistor CMOS EEPROM," IEEE J. Solid-State Circuits, vol. SC-16, No. 3, Jun. 1981, 6 pages.

Hobrecht, S. et al., "An intelligent BiCMOS/DMOS quad 1-A high-side switch," IEEE J. Solid-State Circuits, vol. 25, No. 6, Dec. 1990, 8 pages.

Jinbo, T. et al., "A 5-V-only 16-Mb flash memory with sector erase mode," IEEE J. Solid-State Circuits, vol. 27, No. 11, Nov. 1992, 8 pages.

Lin, P.M. et al., "Topological generation and analysis of voltage multipliers circuits," IEEE Trans. Circuits Syst., vol. CAS-24, No. 10, Oct. 1977, 14 pages.

Monna, G.L.E. et al., "Charge pump for optimal dynamic range filters," 1994 IEEE International Symposium on Circuits and Systems (ISCAS), May 30, 1994, 4 pages.

Pulvirenti, F. et al., "Charger power switch for mobile phones," in Proc. 2nd IEEE-CAS R8 Workshop, Sep. 12, 1997, 4 pages.

Schenkel, M., "Eine neue schaltung fur die erzeugung holder gleichspannungen," Elektrotechnische Zeitschrift, vol. 40, No. 28, Jul. 1919, 2 pages.

Van Steenwijk, G. et al., "Analysis and design of a charge pump circuit for high output current applications," ESSCIRC '93: Nineteenth European Solid-State Circuits Conference, Sep. 22, 1993, 4 pages.

Storti, S. et al., "A 30-A 30-V motor controller and driver," IEEE J. Solid-State Circuits, vol. 23, No. 6, Dec. 1988, 8 pages.

Umezawa, A. et al., "A 5-V-only operation 0.6-um flash EEPROM with row decoder scheme in triple-well structure," IEEE J. Solid-State Circuits, vol. 27, No. 11, Nov. 1992, 7 pages.

Wang, C. et al., "Efficiency improvement in charge pump circuits," IEEE J. Solid-State Circuits, vol. 32, No. 6, Jun. 1997, 9 pages.

Weiner, M., "Analysis of Cockcroft-Walton voltage multipliers with an arbitrary number of stages," The Review of Scientific Instruments, vol. 40, No. 2, Feb. 1969, 4 pages.

Witters, J. et al., "Analysis and modeling of on-chip high voltage generator circuits for use in EEPROM circuits," IEEE J. Solid-State Circuits, vol. 24, No. 5, Oct. 1989, 9 pages.

Wong, S.L. et al., "Design of a 60-V 10-A intelligent power switch using standard cells," IEEE J. Solid-State Circuits, vol. 27, No. 3, Mar. 1992, 4 pages.

* cited by examiner

VOLTAGE MULTIPLIER CIRCUIT

CROSS-REFERENCE TO RELATED APPLICATIONS

This application claims the priority benefit of Italian patent application number 102021000012167, filed on May 12, 2021, and entitled "Voltage Multiplier Circuit," which is hereby incorporated by reference.

TECHNICAL FIELD

The present disclosure relates generally to an electronic system and method, and, in particular embodiments, to a voltage multiplier circuit.

BACKGROUND

Voltage multiplier circuits are known in the art and have been the subject of extensive work as disclosed, for instance, by the documents cited in the following list of reference documents:

[Schenkel] M. Schenkel, "Eine neue schaltung fur die erzeugung holder gleichspannungen," *Elektrotechnische Zeitschrift*, vol. 40, no. 28, pp. 333-335, July 1919;

[Cockcroft] J. D. Cockcroft and E. T. Walton, "Experiments with High Velocity Positive Ions.—(I) Further Developments in the Method of Obtaining High Velocity Positive Ions," *Proc. Roy. Soc., A*, vol. 136, pp. 619-630, 1932;

[Luscher] J. Luscher, "Arrangements for biasing the substrate of an integrated circuit," U.S. Pat. No. 3,845,331, 1974;

[Dickson] J. F. Dickson, "On-chip high-voltage generation in MNOS integrated circuits using an improved voltage multiplier technique," *IEEE J. Solid-State Circuits*, vol. SC-11, pp. 374-378, June 1976;

[Storti] S. Storti, F. Consiglieri and M. Paparo, "A 30-A 30-V motor controller and driver," *IEEE J. Solid-State Circuits*, vol. 23, no. 6, pp. 1394-1401, December 1988;

[Hobrecht] S. Hobrecht, "An intelligent BiCMOS/DMOS quad 1-A high-side switch," *IEEE J. Solid-State Circuits*, vol. 25, no. 6, pp. 1395-1402, December 1990;

[Wong] S. L. Wong, S. Venkitasubrahmanian, M. J. Kim and J. C. Young, "Design of a 60-V 10-A intelligent power switch using standard cells," *IEEE J. Solid-State Circuits*, vol. 27, no. 3, pp. 429-432, March 1992;

[Gariboldi 94] R. Gariboldi and F. Pulvirenti, "A monolithic quad line driver for industrial applications," *IEEE J. Solid-State Circuits*, vol. 29, no. 8, pp. 957-962, August 1994;

[Gariboldi 96] R. Gariboldi and F. Pulvirenti, "A 70 mohm intelligent high side switch with full diagnostics," *IEEE J. Solid-State Circuits*, vol. 31, no. 7, pp. 915-923, July 1996;

[Baveno] F. Pulvirenti, P. Milazzo and R. Ursino, "Charger power switch for mobile phones," in *Proc. 2$^{nd}$ IEEE-CAS R8 Workshop*, 1997, pp. 97-100;

[Gerber] B. Gerber, J. C. Martin and J. Fellrath, "A 1.5 V single-supply one-transistor CMOS EEPROM," *IEEE J. Solid-State Circuits*, vol. SC-16, no. 3, pp. 195-200, June 1981;

[Witters] J. S. Witters, G. Groeseneken and H. E. Maes, "Analysis and modeling of on-chip high voltage generator circuits for use in EEPROM circuits," *IEEE J. Solid-State Circuits*, vol. 24, no. 5, pp. 1342-1380, October 1989;

[Umezawa] A. Umezawa et al., "A 5-V-only operation 0.6-um flash EEPROM with row decoder scheme in triple-well structure," *IEEE J. Solid-State Circuits*, vol. 27, no. 11, pp. 1540-1546, November 1992;

[Jinbo] T. Jinbo et al., "A 5-V-only 16-Mb flash memory with sector erase mode," *IEEE J. Solid-State Circuits*, vol. 27, no. 11, pp. 1547-1554, November 1992;

[Atsumi] S. Atsumi et al., "A 16-Mb flash EEPROM with new self-data-refresh scheme for a sector erase operation," *IEEE J. Solid-State Circuits*, vol. 29, no. 4, pp. 461-469, April 1994;

[Calligaro 1] C. Calligaro, P. Malcovati and G. Torrelli, "Voltage multiplier with output stabilization," in *Proc. 2$^{nd}$ IEEE-CAS R8 Workshop*, 1997, pp. 97-100;

[Calligaro 2] C. Calligaro et al., "Positive and negative CMOS voltage multiplier for 5-V-only flash memories," in *Proc. 2$^{nd}$ IEEE-CAS R8 Workshop*, 1997, pp. 97-100;

[Monna] G. L. E. Monna et al, "Charge pump for optimal dynamic range filters," in *Proc. Iscas '94*, 1994, pp. 747-750;

[Berkhout] M. Berkhout, G. van Steenwijk and A. J. M. van Tuijl, "A low-ripple chargepump circuit for high voltage applications," in *Proc. ESSCIRC'93*, 1993, pp. 290-293;

[Wang] C. C. Wang and J. C. Wu, "Efficiency improvement in charge pump circuits," *IEEE J. Solid-State Circuits*, vol. 32, no. 6, pp. 852-860, June 1997;

[Steenwijk] G. van Steenwijk, K. Hoen and Hans Wallinga, "Analysis and design of a charge pump circuit for high output current applications," in *Proc. ESSCIRC'93*, 1993, pp. 118-121;

[Gasparini] F. Gasparini and G. Zingales, "Sul funzionamento dei moltiplicatori di tensione a raddrizzatori e condensatori," *L'Elettrotecnica*, vol. 46, no. 11, pp. 742-753, November 1959;

[Weiner] M. M. Weiner, "Analysis of Cockcroft-Walton voltage multipliers with an arbitrary number of stages," *The Review of Scientific Instruments*, vol. 40, no. 2, pp. 330-333, February 1969;

[Brugler] J. S. Brugler, "Theoretical performance of voltage multiplier circuits," *IEEE J. Solid-State Circuits*, pp. 132-135, June 1971;

[Lin] P. M. Lin and L. O. Chua, "Topological generation and analysis of voltage multipliers circuits," *IEEE Trans. Circuits Syst.*, vol. cas-24, no. 10, pp. 517-530, October 1977; and

[Pulvirenti] F. Pulvirenti and R. Gariboldi, "Voltage elevator on the charge pump type," European Patent 0 696 839.

In particular, document [Schenkel] discloses a voltage multiplier with discrete capacitors and valve diodes.

Document [Cockcroft] discloses a voltage multiplier for generating voltages greater than those that can be obtained with the circuit disclosed by document [Schenkel], up to several million volts, using capacitors with lower operative range. In the application disclosed by document [Cockcroft], however, the coupling capacitors can be made sufficiently large for efficient multiplication and adequate current capability, while on-chip capacitors have values of few hundred of pF and relatively high values of stray capacitances. Therefore, the voltage multiplier disclosed by document [Cockcroft], conventionally known as Cockcroft-Walton voltage multiplier, did not have large use in integrated circuits, insofar as it is sensitive to the stray capacitance.

Document [Luscher] discloses a voltage multiplier based on the Schenkel topology, which is quite insensitive to the parasitic capacitance, implemented in a monolithic form by replacing the valves with MOS diodes. Such a voltage multiplier circuit is also disclosed in document [Dickson] and it is conventionally known as Dickson multiplier.

On-chip voltage multipliers based on the Dickson architecture are used in smart power integrated circuits for driving the output power transistors, as disclosed for instance by documents [Storti], [Hobrecht], [Wong], [Gariboldi 94], [Gariboldi 96], and [Baveno]; they are used in non-volatile memory circuits for programming and erasing the memory cells, as disclosed for instance by documents [Gerber], [Witters], [Umezawa], [Jinbo], [Atsumi], [Calligaro 1], and [Calligaro 2]; and they are used in low voltage applications for optimizing the dynamic voltage range, as disclosed for instance by document [Monna].

On-chip voltage multipliers based on the Dickson architecture make use of capacitors which are interconnected by diodes and coupled in parallel with two clock signals in anti-phase, as disclosed for instance by documents [Storti], [Hobrecht], [Gerber], [Monna], and [Berkhout]. Implementations of these circuits with MOS transistors accomplishing the diode function are disclosed for instance by documents [Witters], [Wong], [Calligaro 1], and [Calligaro 2].

Voltage multipliers with MOS transistors used like switches are also known in the aft, as disclosed for instance by documents [Umezawa], [Jinbo], [Atsumi], [Gariboldi 94], [Gariboldi 96], and [Wang], especially for low voltage applications, as disclosed for instance by documents [Baveno] and [Steenwijk].

Examples of charge pump circuits for use in a Cockcroft-Walton voltage multiplier are disclosed by documents [Gasparini], [Weiner], [Brugler], and [Lin].

SUMMARY

Despite the extensive activity in the area, known on-chip fully-integrated voltage multipliers may still have the drawback of a large silicon area occupation.

Therefore, there is a need in the aft to provide improved voltage multiplier circuits conceived for high multiplication factors with integrated capacitors and low silicon area occupation.

Some embodiments contribute in providing such improved voltage multiplier circuits.

According to one or more embodiments, such improved voltage multiplier circuits can be achieved by means of a circuit having the features set forth in the claims that follow.

The claims are an integral part of the technical teaching provided herein in respect of the embodiments.

Some embodiments relate to voltage multiplier circuits including a charge pump architecture.

One or more embodiments may be applied to smart power integrated circuits, memory integrated circuits, low voltage applications, controllers and drivers for micro-electro-mechanical systems (MEMS), and the like.

In an embodiment, a voltage multiplier comprises an input node, an output node, and first and second control nodes for receiving first and second clock signals defining two commutation states. An ordered sequence of intermediate nodes is coupled between the input and output nodes and includes two ordered sub-sequences. Capacitors are coupled: between each odd intermediate node in the first sub-sequence and the first control node; between each even intermediate node in the first sub-sequence and the second control node; between each odd intermediate node in the second sub-sequence and a corresponding odd intermediate node in the first sub-sequence; and between each even intermediate node in the second sub-sequence and a corresponding even intermediate node in the first sub-sequence. The circuit comprises selectively conductive electronic components coupled to the intermediate nodes. In the first commutation state, the electronic components provide conductive paths: between each of the even intermediate nodes and a respective next odd intermediate node, between the input node and the first intermediate node, and between the last intermediate node and the output node. In the second commutation state, the electronic components provide conductive paths between each of the odd intermediate nodes and a respective next even intermediate node.

In one or more embodiments, a voltage multiplier circuit may comprise a first input node and a second input node configured to receive therebetween an input voltage from a voltage source. The voltage multiplier circuit may comprise a first output node and a second output node configured to be coupled to an output capacitor to produce an output voltage across the output capacitor. The voltage multiplier circuit may comprise a first input control node configured to receive a first clock signal and a second input control node configured to receive a second clock signal, the second clock signal being in phase opposition to the first clock signal. The voltage multiplier circuit may thus switch between a first commutation state and a second commutation state as a function of the values of the first clock signal and the second clock signal. The voltage multiplier circuit may comprise an ordered sequence of intermediate voltage nodes arranged between the first input node and the first output node. The ordered sequence may include a first ordered sub-sequence of intermediate voltage nodes and a second ordered sub-sequence of intermediate voltage nodes (e.g., at least two ordered sub-sequences). Each ordered sub-sequence may comprise the same number of intermediate voltage nodes. For instance, the number may be even. For instance, the number may be equal to or higher than four. The voltage multiplier circuit may comprise a respective capacitor connected between each odd-numbered intermediate voltage node in the first ordered sub-sequence of the ordered sequence and the first input control node. A first intermediate voltage node in the first ordered sub-sequence may be selectively couplable to the first input node. The voltage multiplier circuit may comprise a respective capacitor connected between each even-numbered intermediate voltage node in the first ordered sub-sequence of the ordered sequence and the second input control node. The voltage multiplier circuit may comprise a respective capacitor connected between each odd-numbered intermediate voltage node in the second ordered sub-sequence of the ordered sequence and a corresponding odd-numbered intermediate voltage node in the first ordered sub-sequence of the ordered sequence. The voltage multiplier circuit may comprise a respective capacitor connected between each even-numbered intermediate voltage node in the second ordered sub-sequence of the ordered sequence and a corresponding even-numbered intermediate voltage node in the first ordered sub-sequence of the ordered sequence. The voltage multiplier circuit may comprise a first plurality of selectively conductive electronic components coupled to the intermediate voltage nodes of the ordered sequence. In the first commutation state of the voltage multiplier circuit, the electronic components may be configured to provide electrically-conductive paths between each of the even-numbered intermediate voltage nodes of the ordered sequence and a respective next odd-numbered intermediate voltage node of the ordered sequence, an electrically-conductive path between the first input node and the first intermediate voltage node of the ordered sequence, and an electrically-conductive path between the last intermediate voltage node of the ordered sequence and the first output node. In the second commutation state of the voltage multiplier circuit, the electronic components may be configured to provide electrically-conductive paths between each of the odd-numbered intermediate voltage nodes of the ordered sequence and a respective next even-numbered intermediate voltage node of the ordered sequence.

In one or more embodiments, the voltage multiplier circuit may comprise a further ordered sequence of intermediate voltage nodes arranged between the first input node and the first output node. The further ordered sequence may include a respective first ordered sub-sequence of intermediate voltage nodes and a respective second ordered sub-sequence of intermediate voltage nodes (e.g., at least two ordered sub-sequences). Each ordered sub-sequence may comprise the same number of intermediate voltage nodes. For instance, the number may be even. For instance, the number may be equal to or higher than four. The voltage multiplier circuit may comprise a respective capacitor connected between each odd-numbered intermediate voltage node in the first ordered sub-sequence of the further ordered sequence and the second input control node. A first intermediate voltage node in the first ordered sub-sequence of the further ordered sequence may be selectively couplable to the first input node. The voltage multiplier circuit may comprise a respective capacitor connected between each even-numbered intermediate voltage node in the first ordered sub-sequence of the further ordered sequence and the first input control node. The voltage multiplier circuit may comprise a respective capacitor connected between each odd-numbered intermediate voltage node in the second ordered sub-sequence of the further ordered sequence and a corresponding odd-numbered intermediate voltage node in the first ordered sub-sequence of the further ordered sequence. The voltage multiplier circuit may comprise a respective capacitor connected between each even-numbered intermediate voltage node in the second ordered sub-sequence of the further ordered sequence and a corresponding even-numbered intermediate voltage node in the first ordered sub-sequence of the further ordered sequence. The voltage multiplier circuit may comprise a further plurality of selectively conductive electronic components coupled to the intermediate voltage nodes of the further ordered sequence. In the first commutation state of the voltage multiplier circuit, the further electronic components may be configured to provide electrically-conductive paths between each of the odd-numbered intermediate voltage nodes of the further ordered sequence and a respective next even-numbered intermediate voltage node of the further ordered sequence. In the second commutation state of the voltage multiplier circuit, the further electronic components may be configured to provide electrically-conductive paths between each of the even-numbered intermediate voltage nodes of the further ordered sequence and a respective next odd-numbered intermediate voltage node of the further ordered sequence, an electrically-conductive path between the first input node and the first intermediate voltage node of the further ordered sequence, and an electrically-conductive path between the last intermediate voltage node of the further ordered sequence and the first output node.

In one or more embodiments, the ordered sequence of intermediate voltage nodes and the further ordered sequence of intermediate voltage nodes may include at least one respective third ordered sub-sequence of intermediate voltage nodes. Each ordered sub-sequence may comprise the same number of intermediate voltage nodes. For instance, the number may be even. For instance, the number may be equal to or higher than four.

One or more embodiments may thus facilitate reducing the silicon area occupation of a voltage multiplier circuit.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for brevity.

Figure 1:
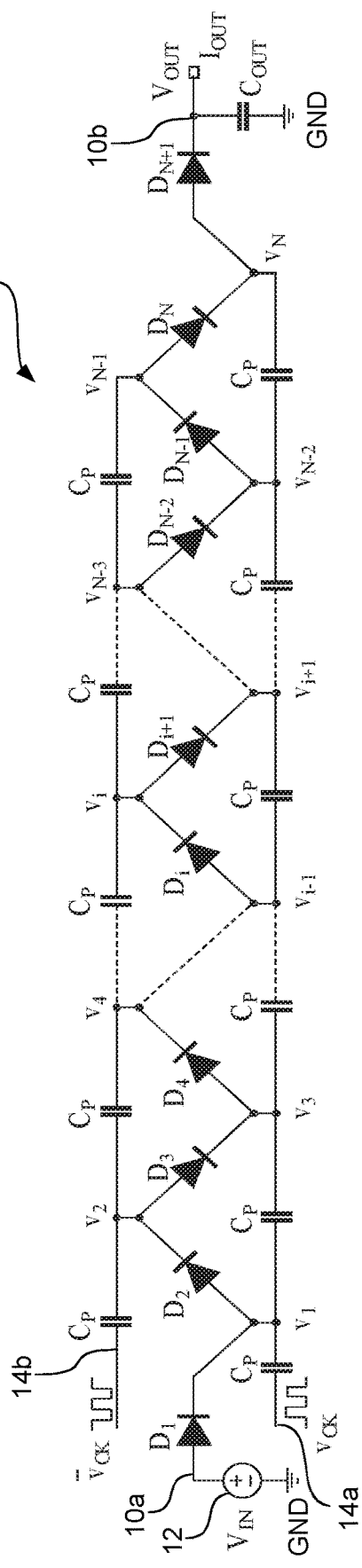
FIG. 1 is a circuit diagram exemplary of a conventional N-stage voltage multiplier circuit according to a Cockcroft-Walton architecture.
Figure 2:
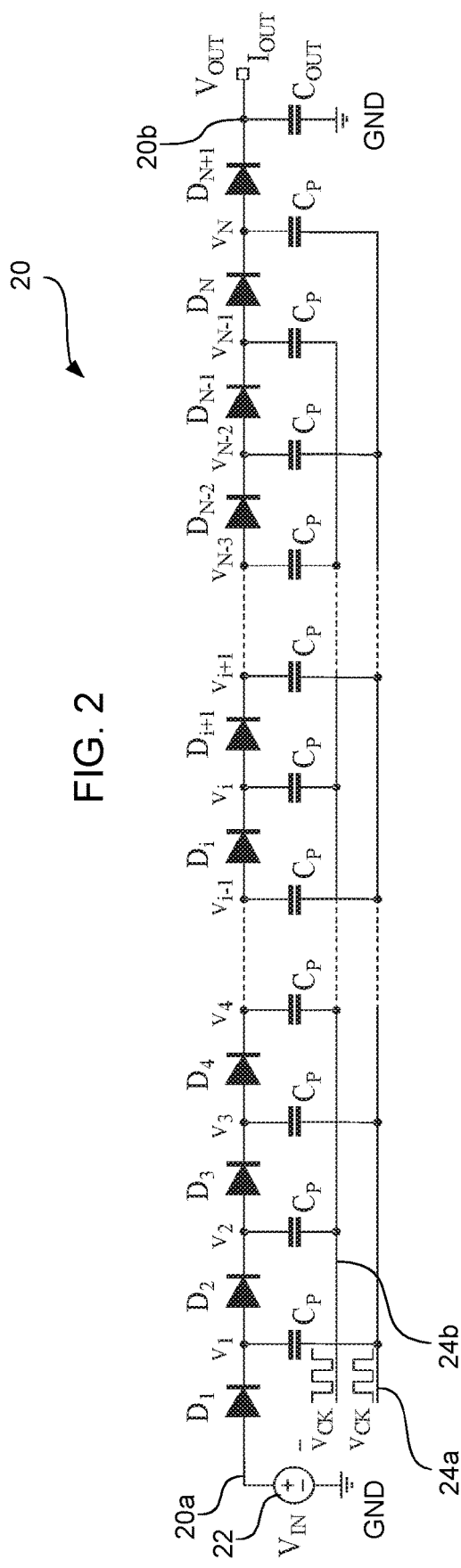
FIG. 2 is a circuit diagram exemplary of a conventional N-stage voltage multiplier according to a Dickson architecture.
Figure 3:
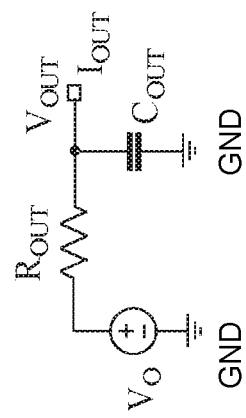
FIG. 3 is a circuit diagram exemplary of an equivalent circuit of a voltage multiplier circuit.

By way of introduction to the detailed description of exemplary embodiments, reference may first be made to FIGS. 1, 2 and 3.

FIG. 1 is a circuit diagram exemplary of a conventional N-stage voltage multiplier 10 according to a Cockcroft-Walton architecture. The voltage multiplier circuit 10 comprises an input node 10a configured to receive an input voltage $V_{IN}$ from a voltage source 12, an output node 10b configured to produce an output voltage $V_{OUT}$ across a storage capacitor $C_{OUT}$, and a chain (or string) comprising N+1 diodes $D_1, \ldots, D_{N+1}$ coupled (e.g., in series) between the input node 10a and the output node 10b and conductive from the input node 10a towards the output node 10b. For instance, a first diode $D_1$ has an anode terminal coupled to the input node 10a and a cathode terminal coupled to the anode terminal of a second diode $D_2$, each of the intermediate diodes $D_2, \ldots, D_N$ has a respective anode terminal coupled to the cathode terminal of the preceding diode and a respective cathode terminal coupled to the anode terminal of the next (subsequent) diode, and a last diode $D_{N+1}$ has an anode terminal coupled to the cathode terminal of a second-to-last diode $D_N$ and a cathode terminal coupled to the output node 10b. The voltage multiplier circuit 10 comprises a first drive input node 14a configured to receive a first driving clock signal $v_{CK}$ and a second drive input node 14b configured to receive a second driving clock signal $\overline{v_{CK}}$ which is in phase opposition to the first driving clock signal $v_{CK}$ (e.g., $v_{CK}$ and $\overline{v_{CK}}$ may be two square-wave clock signals having a duty cycle of 50% and shifted by half clock period). The voltage multiplier circuit 10 comprises N pumping (or coupling) capacitors $C_P$. A first pumping capacitor $C_P$ has a first terminal coupled to a node intermediate the first and second diodes of the diode chain (i.e., coupled to the cathode terminal of the first diode $D_1$ of the chain), and a second terminal coupled to the first drive input node 14a. A second pumping capacitor $C_P$ has a first terminal coupled to a node intermediate the second and third diodes of the diode chain (i.e., coupled to the cathode terminal of the second diode $D_2$ of the chain), and a second terminal coupled to the second drive input node 14b. As for the other pumping capacitors, a generic $j^{th}$ pumping capacitor has a respective first terminal coupled to the cathode terminal of the $j^{th}$ diode of the chain, and a respective second terminal coupled to the cathode terminal of the $(j-2)^{th}$ diode of the chain.

FIG. 2 is a circuit diagram exemplary of a conventional N-stage voltage multiplier 20 according to a Dickson architecture. The voltage multiplier circuit 20 comprises an input node 20a configured to receive an input voltage $V_{IN}$ from a voltage source 22, an output node 20b configured to produce an output voltage $V_{OUT}$ across a storage capacitor $C_{OUT}$, and a chain (or string) comprising N+1 diodes $D_1, \ldots, D_{N+1}$ coupled (e.g., in series) between the input node 20a and the output node 20b and conductive from the input node 20a towards the output node 20b, substantially in the same way as illustrated in FIG. 1. The voltage multiplier circuit 20 comprises a first drive input node 24a configured to receive a first driving clock signal $v_{CK}$ and a second drive input node 24b configured to receive a second driving clock signal $\overline{v_{CK}}$ which is in phase opposition to the first driving clock signal $v_{CK}$ (e.g., $v_{CK}$ and $\overline{v_{CK}}$ may be two square-wave clock signals having a duty cycle of 50% and shifted by half clock period). The voltage multiplier circuit 20 comprises N pumping (or coupling) capacitors $C_P$. Each pumping capacitor $C_P$ has a first terminal coupled to a node intermediate two diodes of the diode chain, and a second terminal coupled to the first drive input node 24a or the second drive input node 24b. In particular, two pumping capacitors having their first terminals coupled to a same diode of the diode chain (i.e., one to the anode and the other to the cathode of the diode) have their second terminals coupled to two different drive input nodes, so that the anode and the cathode of each diode in the diode chain are driven at different voltage levels during operation of the voltage multiplier circuit 20. In other terms, the pumping capacitors having their first terminal coupled to the cathode of odd-numbered diodes of the diode chain have their second terminal coupled to the first drive input node 24a, and the pumping capacitors having their first terminal coupled to the cathode of even-numbered diodes of the diode chain have their second terminal coupled to the second drive input node 24b.

In both circuits as exemplified in FIGS. 1 and 2, the storage capacitor $C_{OUT}$ is configured to store charges and provide a stable output voltage $V_{OUT}$, the N pumping capacitors $C_P$ are configured to pump the charges, and the diodes are configured to transfer the charges in only one direction from the input node towards the output node. Operation of the multiplier circuits as exemplified in FIGS. 1 and 2 is known to the person skilled in the art: the pumping capacitors $C_P$, driven by two clock signals in phase opposition with voltage amplitude $V_{CK}$, are alternatively charged and discharged during each half period of the clock signals, so that charge "packets" are pumped along the diode chain pulling up the output voltage $V_{OUT}$.

FIG. 3 is a circuit diagram exemplary of an equivalent circuit of the voltage multiplier circuits 10 and 20, where $V_O$ is the voltage generated by the multiplier circuit in open load condition, and $R_{OUT}$ is the equivalent output resistance. From the equivalent circuit exemplified in FIG. 3, the output voltage $V_{OUT}$ a can be computed according to equation (1) below:

$$V_{OUT} = V_O - R_{OUT} I_{OUT} \tag{1}$$

The open load voltage $V_O$ and the output resistance $R_{OUT}$ of the voltage multiplier circuits 10 and 20 are reported in document [Dickson], taking the stray capacitances into account. The equations which define the output resistance $R_{OUT}$ are valid if the clock period is much longer than the time constant $R_D C_P$, where $R_D$ is the diodes resistance. The results are resumed in equations (2) to (4) below, with equation (2) valid for both multipliers, equation (3) valid for the Dickson multiplier 20, and equation (4) valid for the Cockcroft-Walton multiplier 10:

$$V_O = V_{IN} - (N+1) \cdot V_D + N \cdot V_{CK} \quad (2)$$

$$R_{OUT} = \frac{1}{f \cdot C_P} \cdot N \quad (3)$$

$$R_{OUT} = \begin{cases} \frac{1}{f \cdot C_P} \cdot 2 \sum_{k=1}^{\frac{N}{2}} i^2 & \text{if } N \text{ even} \\ \frac{1}{f \cdot C_P} \cdot \left[ \sum_{k=1}^{\frac{N+1}{2}} i^2 + \sum_{k=1}^{\frac{N+1}{2}} i^2 \right] & \text{if } N \text{ odd} \end{cases} \quad (4)$$

where $V_{IN}$ is the input voltage of the multiplier circuit, $V_{CK}$ is the swing voltage of the clock signals, $V_D$ is the forward voltage drop of the diodes, and f is the clock frequency.

It is noted that that the Cockcroft-Walton multiplier 10 has two main limitations: efficient voltage multiplication can occur only if the pumping capacitors are much greater than the stray capacitors, and the output impedance increases rapidly with the number of multiplying stages. Another limitation of the Cockcroft-Walton multiplier 10, when implemented in a monolithic integrated circuit, is that the silicon size increases rapidly with the number of multiplying stages compared to the Dickson multiplier 20, if both circuits are designed to have the same output impedance.

On the other hand, a Dickson multiplier implemented in a monolithic integrated circuit cannot reach high output voltage due to the voltage limitation of on-chip capacitors.

For instance, in the case of a voltage multiplier circuit producing an output voltage $V_{OUT}$=70 V starting from an input voltage $V_{IN}$=3.3 V, using pumping capacitors which have an operating voltage of 12 V, a Dickson multiplier would not be suitable due to the voltage limitation of the capacitors, while a Cockcroft-Walton multiplier with the same output impedance would have a much bigger size, according to equation (5) below obtained comparing the values of $R_{OUT}$ given by equations (3) and (4a):

$$Size_{Cockcroft-Walton} = \frac{\sum_{k=1}^{N/2} i^2}{N/2} \cdot Size_{Dickson} \quad (5)$$

Therefore, there is a need in the art to provide improved voltage multiplier circuits relying on the maximum voltage capability of on-chip capacitors while reducing the silicon area occupation.

Figure 4:
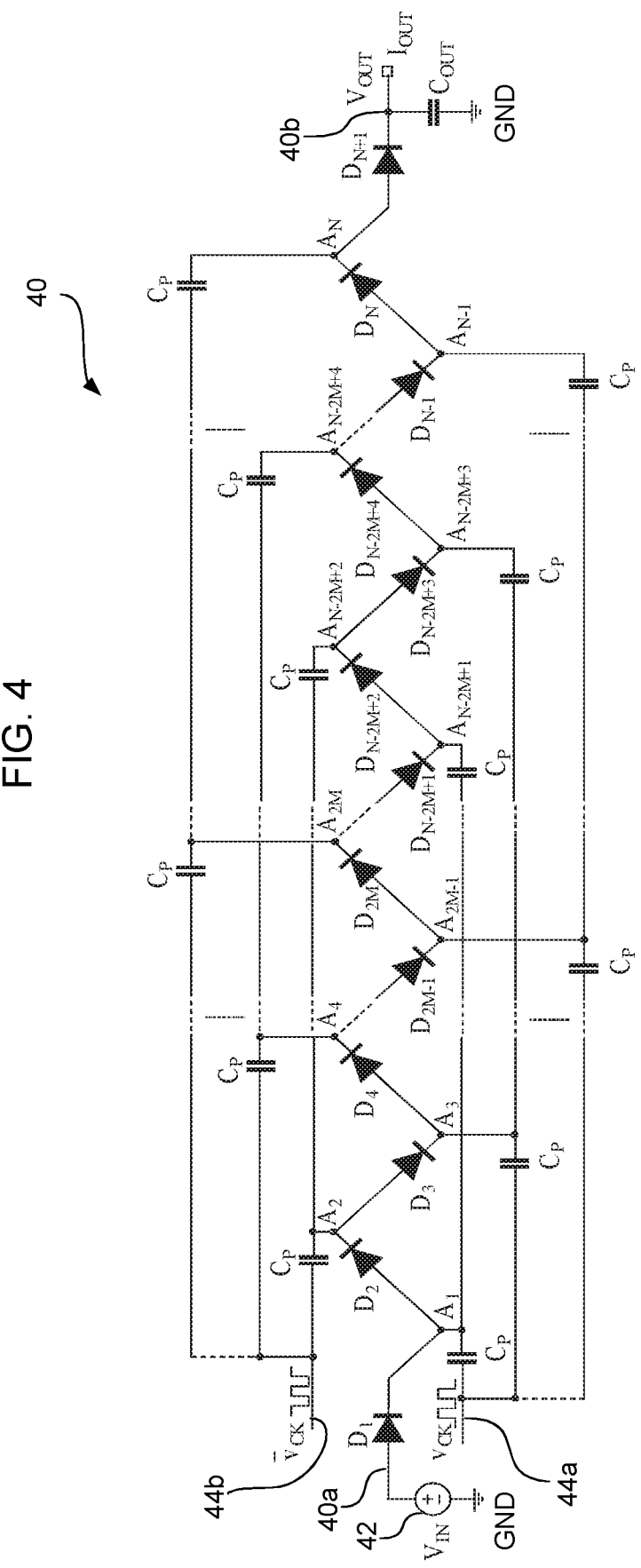
FIG. 4 is a circuit diagram exemplary of a voltage multiplier circuit having a single branch architecture for generating positive voltages according to one or more embodiments of the present description.

One or more embodiments may thus relate to a voltage multiplier circuit 40 as exemplified in FIG. 4. FIG. 4 is a circuit diagram exemplary of a voltage multiplier circuit 40 having a single branch architecture for generating positive voltages.

As exemplified in FIG. 4, a voltage multiplier circuit 40 comprises a chain of diodes $D_1, \ldots, D_{N+1}$ arranged between an input node 40*a* configured to receive an input voltage $V_{IN}$ from a voltage source 42 and an output node 40*b* configured to produce an output voltage $V_{OUT}$, substantially as discussed with reference to FIGS. 1 and 2. The chain of diodes provides an ordered sequence of intermediate voltage nodes $A_1, \ldots, A_N$ between the input node 40*a* and the output node 40*b* (e.g., with generic node $A_x$ corresponding to the cathode terminal of generic diode $D_x$).

The voltage multiplier circuit 40 comprises a first drive input node 44*a* configured to receive a first driving clock signal $v_{CK}$ and a second drive input node 44*b* configured to receive a second driving clock signal $\overline{v_{CK}}$ which is in phase opposition to the first driving clock signal $v_{CK}$. The voltage multiplier circuit 40 comprises N pumping (or coupling) capacitors $C_P$. As exemplified in FIG. 4, the N pumping capacitors $C_P$ are arranged in a number K=N/M of groups (e.g., clusters), each group comprising M capacitors.

The first group of pumping capacitors comprises M pumping capacitors $C_P$ which have a first terminal coupled to the odd-numbered intermediate voltage nodes $A_1$, $A_3, \ldots, A_{2M-1}$ (e.g., a first node and a third node) in a first sub-sequence of 2M intermediate voltage nodes numbered from 1 to 2M (i.e., $A_1, \ldots, A_{2M}$), and a second terminal coupled to the first drive input node 44*a* to receive the first driving clock signal $v_{CK}$. The second group of pumping capacitors comprises M pumping capacitors $C_P$ which have a first terminal coupled to the even-numbered intermediate voltage nodes $A_2, A_4, \ldots, A_{2M}$ (e.g., a second node and a fourth node) in the first sub-sequence of 2M intermediate voltage nodes, and a second terminal coupled to the second drive input node 44*b* to receive the second driving clock signal $\overline{v_{CK}}$. Therefore, the pumping capacitors in the first and second groups are arranged substantially as in a Dickson architecture.

The third group of pumping capacitors comprises M pumping capacitors $C_P$ which have a first terminal coupled to the odd-numbered intermediate voltage nodes $A_{2M+1}$, $A_{2M+3}, \ldots, A_{4M-1}$ (e.g., a first node and a third node) in a second sub-sequence of 2M intermediate voltage nodes numbered from 2M+1 to 4M (not visible in FIG. 4), and a second terminal coupled to the corresponding odd-numbered intermediate voltage nodes $A_1, A_3, \ldots, A_{2M-1}$ (e.g., a first node and a third node) in the first sub-sequence of 2M intermediate voltage nodes numbered from 1 to 2M. In other terms, the pumping capacitors of the third group are stacked to the pumping capacitors of the first group, similarly to a Cockcroft-Walton architecture. The fourth group of pumping capacitors comprises M pumping capacitors $C_P$ which have a first terminal coupled to even-numbered intermediate voltage nodes $A_{2M+2}, A_{2M+4}, \ldots, A_{4M}$ (e.g., a second node and a fourth node) in the second sub-sequence of 2M intermediate voltage nodes numbered from 2M+1 to 4M (not visible in FIG. 4), and a second terminal coupled to the corresponding even-numbered intermediate voltage nodes $A_2, A_4, \ldots, A_{2M}$ (e.g., a second node and a fourth node) in the first sub-sequence of 2M intermediate voltage nodes numbered from 1 to 2M. In other terms, the pumping capacitors of the fourth group are stacked to the pumping capacitors of the second group, similarly to a Cockcroft-Walton architecture.

In the present description, two intermediate voltage nodes of two different sub-sequences are referred to as "corresponding" when they occupy the same position (e.g., 1st position, 2nd position, etc.) in the respective ordered sub-sequences.

The number of groups of pumping capacitors depends on the number N of stages of the voltage multiplier and the number M of capacitors in each group. Generally, a second-to-last group of pumping capacitors comprises M pumping capacitors $C_P$ which have a first terminal coupled to the odd-numbered intermediate voltage nodes $A_{N-2M+1}$, $A_{N-2M+3}, \ldots, A_{N-1}$ in a last sub-sequence of 2M intermediate voltage nodes numbered from N−2M+1 to N, and a second terminal coupled to the corresponding odd-numbered intermediate voltage nodes $A_{N-4M+1}, A_{N-4M+3}, \ldots, A_{N-2M-1}$ in a second-to-last sub-sequence of intermediate voltage nodes numbered from N−4M+1 to N−2M (not visible in FIG. 4). In other terms, the pumping capacitors of the second-to-last group are stacked to the pumping capacitors of a fourth-to-last group, similarly to a Cockcroft- Walton architecture. The last group of pumping capacitors comprises M pumping capacitors $C_P$ which have a first terminal coupled to even-numbered intermediate voltage nodes $A_{N-2M+2}, A_{N-2M+4}, \ldots, A_N$ in the last sub-sequence of 2M intermediate voltage nodes numbered from $N-2M+1$ to N, and a second terminal coupled to the corresponding even-numbered intermediate voltage nodes $A_{N-4M+2}$, $A_{N-4M+4}, \ldots, A_{N-2M}$ in the second-to-last sub-sequence of intermediate voltage nodes numbered from $N-4M+1$ to $N-2M$ (not visible in FIG. 4). In other terms, the pumping capacitors of the last group are stacked to the pumping capacitors of a third-to-last group, similarly to a Cockcroft-Walton architecture.

Therefore, in a voltage multiplier circuit 40 as exemplified in FIG. 4, the first two groups of pumping capacitors $C_P$ are arranged substantially as in a Dickson architecture, and the remaining (intermediate and last) groups of pumping capacitors $C_P$ are stacked to the previous ones, similarly to a Cockcroft-Walton multiplier (e.g., they have the lower terminals connected to the higher terminals of the capacitors in the previous two groups of capacitors and the higher terminals connected to the diode chain, progressively towards the output). In brief, the pumping capacitors belonging to a same group are arranged "in parallel" like in a Dickson charge pump, while different groups of pumping capacitors are stacked one to another similarly to a Cockcroft-Walton charge pump.

Figure 5:
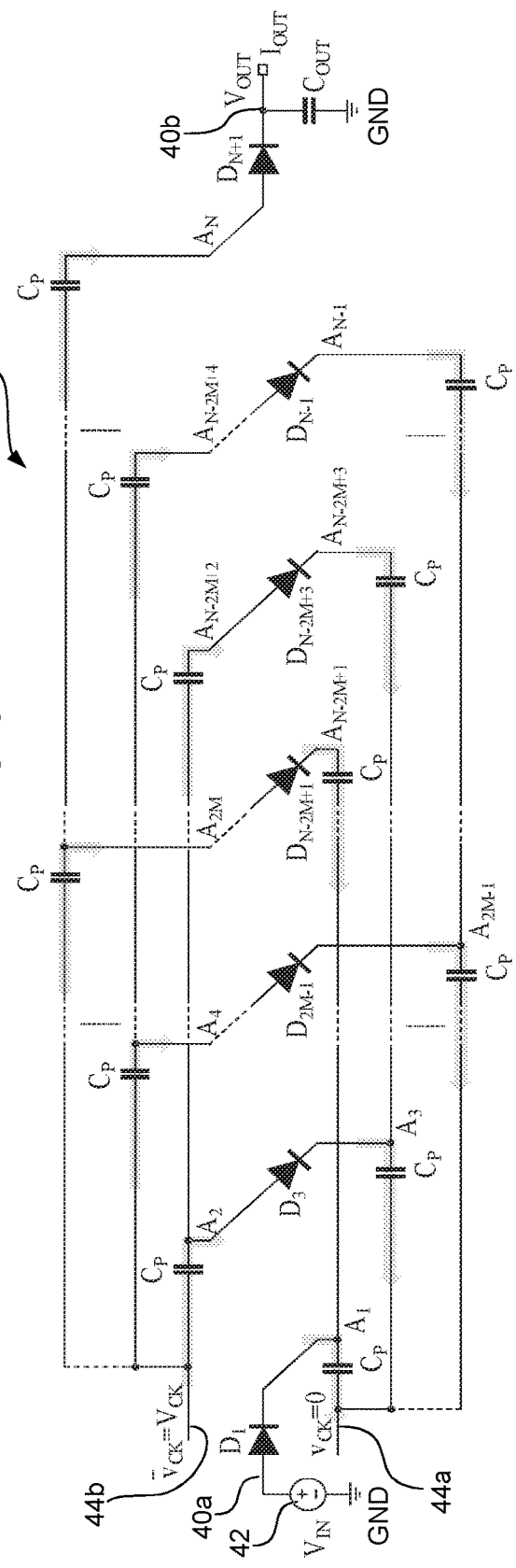
FIGS. 5 and 6 are circuit diagrams exemplary of operation of a voltage multiplier circuit according to FIG. 4.
Figure 6:
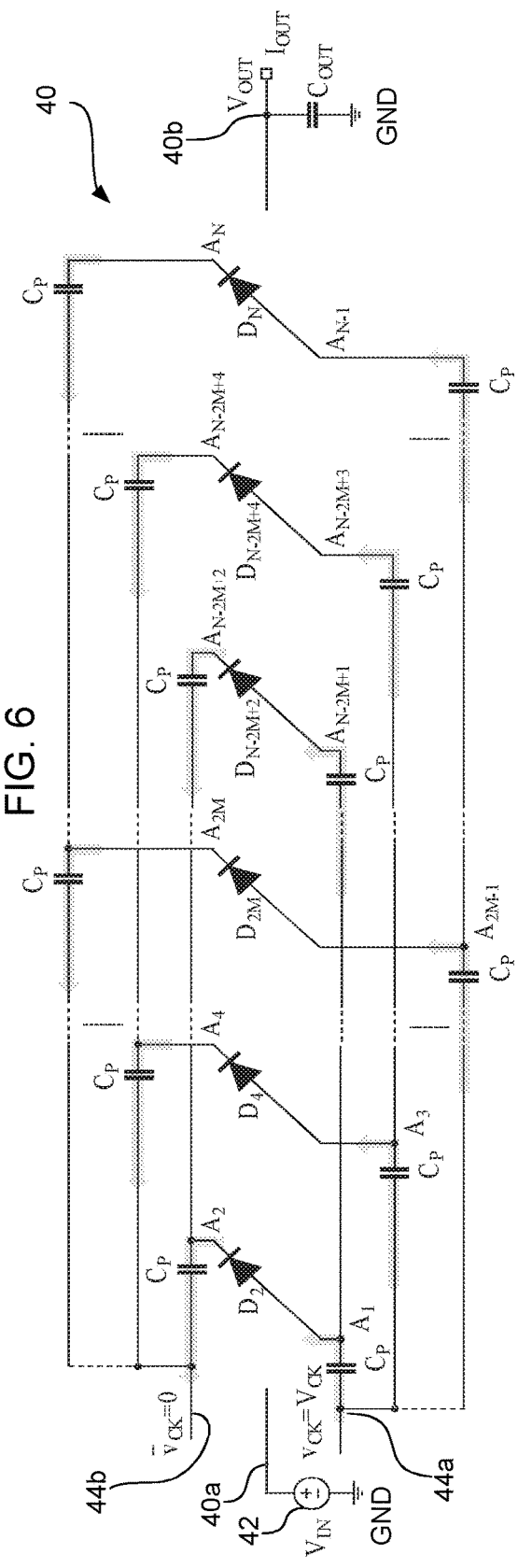

Operation of a voltage multiplier circuit 40 as exemplified in FIG. 4 is explained with reference to FIGS. 5 and 6. FIG. 5 is exemplary of charge transfer in the circuit 40 during a first half period of the clock signals $v_{CK}$ and $\overline{v_{CK}}$, in particular when $v_{CK}=0$ (low value) and $\overline{v_{CK}}=V_{CK}$ (high value). FIG. 6 is exemplary of charge transfer in the circuit 40 during a second half period of the clock signals $v_{CK}$ and $\overline{v_{CK}}$, in particular when $v_{CK}=V_{CK}$ (high value) and $\overline{v_{CK}}=0$ (low value).

In the first half clock period, when $v_{CK}$ is low and $\overline{v_{CK}}$ is high, the pumping capacitors driven by signal $v_{CK}$ (i.e., coupled to the odd-numbered intermediate voltage nodes) are charged at a (more) positive voltage. They receive the charge "packets" through the odd diodes from the pumping capacitors driven by signal $\overline{v_{CK}}$ (i.e., those coupled to the even-numbered intermediate voltage nodes) which are contextually discharged. In this phase, the first pumping capacitor is directly charged by the input voltage $V_{IN}$. In the second half clock period, when $v_{CK}$ is high and $\overline{v_{CK}}$ is low, the pumping capacitors driven by signal $v_{CK}$ are discharged. They provide the charge packets through the even diodes to the pumping capacitors driven by signal $\overline{v_{CK}}$, which are contextually charged at a more positive voltage.

In the first group of M pumping capacitors, driven by signal $v_{CK}$, the first pumping capacitor (coupled between node 44a and node $A_1$) is charged at $V_{IN}-V_D$, the third pumping capacitor (coupled between node 44a and node $A_3$) is charged at $V_{IN}+2V_{CK}-3V_D$, the fifth pumping capacitor (coupled between node 44a and node $A_5$) is charged at $V_{IN}+4V_{CK}-5V_D$, and so on, up to the $(2M-1)^{th}$ pumping capacitor (coupled between node 44a and node $A_{2M-1}$) that is charged at $V_{IN}+(2M-2)\cdot V_{CK}-(2M-1)\cdot V_D$. In the second group of pumping capacitors, driven by $\overline{v_{CK}}$, the second pumping capacitor (coupled between node 44b and node $A_2$) is charged at $V_{IN}+V_{CK}-2V_D$, the fourth pumping capacitor (coupled between node 44b and node $A_4$) is charged at $V_{IN}+3V_{CK}-4V_D$, the sixth pumping capacitor (coupled between node 44b and node $A_6$) is charged at $V_{IN}+5V_{CK}-6V_D$, and so on, up to the $2M^{th}$ pumping capacitor (coupled between node 44b and node $A_{2M}$) that is charged at $V_{IN}+$ $(2M-1)\cdot V_{CK}-2M\cdot V_D$. The pumping capacitors from $2M+1$ to N (i.e., those in the third and subsequent groups) are all charged at $2M\cdot(V_{CK}-V_D)$; this is the voltage across the two terminals of the capacitors. The output capacitor is charged at $V_{IN}+N\cdot V_{CK}-(N+1)\cdot V_D$, as reported in equation (2) for the known multipliers.

It is noted that the equivalent output resistance of a voltage multiplier circuit 40 can be computed as a combination of a 2M-stage Dickson multiplier and a N/2M-stage Cockcroft-Walton multiplier, according to equation (6) below, provided that the clock period is much longer than the time constant $R_D C_P$, where $R_D$ is the diodes resistance:

$$R_{OUT} = \frac{1}{f \cdot C_P} \cdot 2M \sum_{i=1}^{\frac{N}{2M}} i^2 \qquad (6)$$

Concerning the silicon size, comparing equations (3) and (6) for the computation of $R_{OUT}$, it is noted that the size of an architecture as in FIG. 4 (also referred to as "hybrid" architecture hereinafter) can be expressed as:

$$Size_{Hybrid} = \frac{\sum_{i=1}^{N/2M} i^2}{N/2M} \cdot Size_{Dickson} \qquad (7)$$

Figure 7:
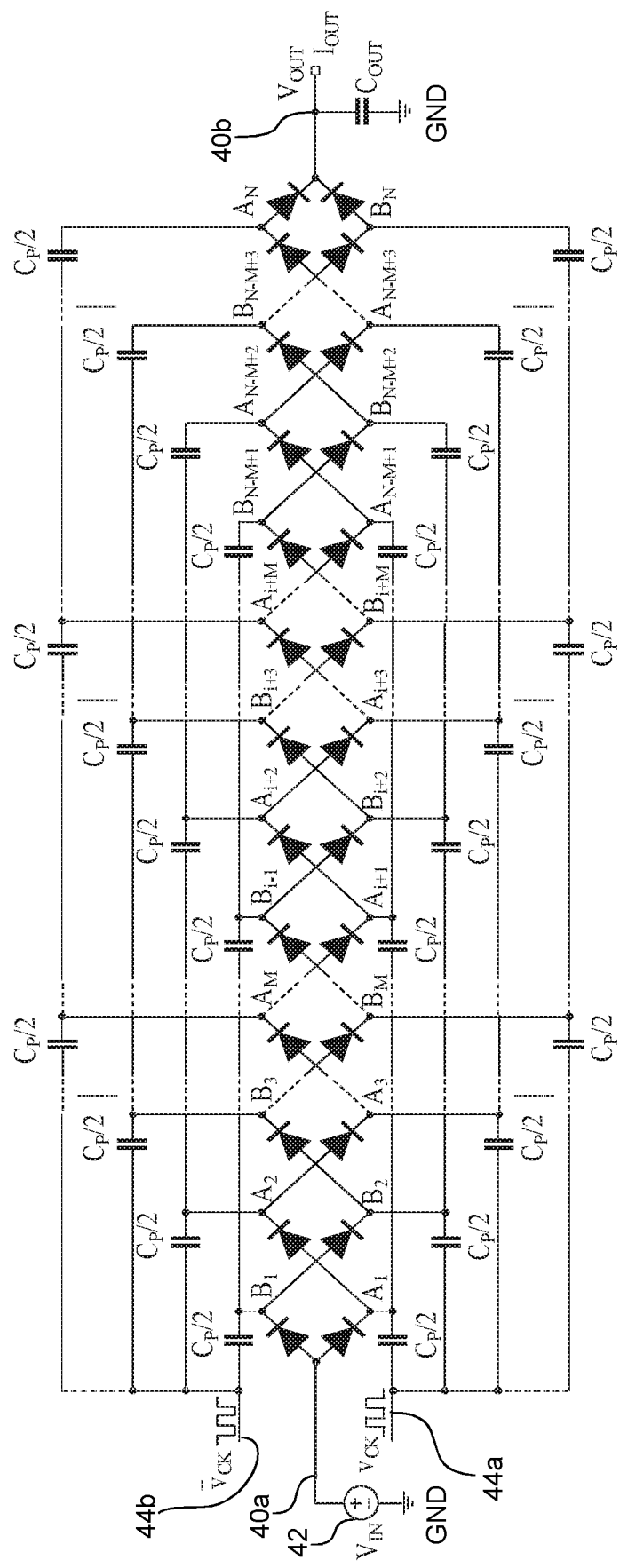
FIG. 7 is a circuit diagram exemplary of a voltage multiplier circuit having a dual branch architecture for generating positive voltages according to one or more embodiments of the present description.

One or more embodiments may relate to a voltage multiplier circuit 70 as exemplified in FIG. 7. FIG. 7 is a circuit diagram exemplary of a voltage multiplier circuit 70 having a dual branch architecture for generating positive voltages, based on the same concept discussed with reference to FIGS. 4, 5 and 6.

As exemplified in FIG. 7, a voltage multiplier circuit 70 comprises a first chain of N+1 diodes arranged between the input node 40a and the output node 40b defining intermediate nodes $A_1, \ldots, A_N$ substantially as discussed with reference to FIG. 4, and a second chain of N+1 diodes arranged between the input node 40a and the output node 40b, again substantially as discussed with reference to FIG. 4, which define a further set of intermediate voltage nodes $B_1, \ldots, B_N$. The voltage multiplier circuit 70 comprises 2N pumping (or coupling) capacitors $C_P/2$. As exemplified in FIG. 7, the 2N pumping capacitors $C_P/2$ are arranged in two subsets, each subset comprising a number K=N/M of groups (e.g., clusters), each group comprising M capacitors. The first subset includes the pumping capacitors driven by the clock signal $v_{CK}$ (e.g., coupled to node 44a) and the second subset includes the pumping capacitors driven by the clock signal $\overline{v_{CK}}$ (e.g., coupled to node 44b).

The first group of the first subset of pumping capacitors comprises the pumping capacitors $C_P/2$ which have a first terminal coupled to odd-numbered intermediate voltage nodes $A_1, A_3, \ldots, A_{M-1}$ (e.g., a first node and a third node) in a first sub-sequence of M intermediate voltage nodes numbered from 1 to M of the first set of voltage nodes $A_1, \ldots, A_N$, and a second terminal coupled to the first drive input node 44a to receive the first driving clock signal $v_{CK}$. The first group of the first subset of pumping capacitors also comprises the pumping capacitors $C_P/2$ which have a first terminal coupled to the even-numbered intermediate voltage nodes $B_2, B_4, \ldots, B_M$ (e.g., a second node and a fourth node) in a first sub-sequence of M intermediate voltage nodes numbered from 1 to M of the second set of voltage nodes $B_1, \ldots, B_N$, and a second terminal coupled to the first drive input node 44a to receive the first driving clock signal $v_{CK}$.

The first group of the second subset of pumping capacitors comprises the pumping capacitors $C_P/2$ which have a first terminal coupled to the even-numbered intermediate voltage nodes $A_2, A_4, \ldots, A_M$ (e.g., a second node and a fourth node) in the first sub-sequence of M intermediate voltage nodes numbered from 1 to M of the first set of voltage nodes $A_1, \ldots, A_N$, and a second terminal coupled to the second drive input node 44b to receive the second driving clock signal $\overline{v_{CK}}$. The first group of the second subset of pumping capacitors also comprises the pumping capacitors $C_P/2$ which have a first terminal coupled to odd-numbered intermediate voltage nodes $B_1, B_3, \ldots, B_{M-1}$ (e.g., a first node and a third node) in the first sub-sequence of M intermediate voltage nodes numbered from 1 to M of the second set of voltage nodes $B_1, \ldots, B_N$, and a second terminal coupled to the second drive input node 44b to receive the second driving clock signal $\overline{v_{CK}}$.

The second group of the first subset of pumping capacitors comprises the pumping capacitors $C_P/2$ which have a first terminal coupled to the odd-numbered intermediate voltage nodes $A_{M+1}, A_{M+3}, \ldots, A_{2M-1}$ (e.g., a first node and a third node) in a second sub-sequence of M intermediate voltage nodes numbered from M+1 to 2M of the first set of voltage nodes $A_1, \ldots, A_N$, and a second terminal coupled to the corresponding odd-numbered intermediate voltage nodes $A_1, A_3, \ldots, A_{M-1}$ (e.g., a first node and a third node) in the first sub-sequence of M intermediate voltage nodes numbered from 1 to M of the first set of voltage nodes $A_1, \ldots, A_N$. The second group of the first subset of pumping capacitors also comprises the pumping capacitors $C_P/2$ which have a first terminal coupled to the even-numbered intermediate voltage nodes $B_{M+2}, B_{M+4}, \ldots, B_M$ (e.g., a second node and a fourth node) in a second sub-sequence of M intermediate voltage nodes numbered from M+1 to 2M of the second set of voltage nodes $B_1, \ldots, B_N$, and a second terminal coupled to the corresponding even-numbered intermediate voltage nodes $B_2, B_4, \ldots, B_M$ (e.g., a second node and a fourth node) in the first sub-sequence of M intermediate voltage nodes numbered from 1 to M of the second set of voltage nodes $B_1, \ldots, B_N$.

The second group of the second subset of pumping capacitors comprises the pumping capacitors $C_P/2$ which have a first terminal coupled to the even-numbered intermediate voltage nodes $A_{M+2}, A_{M+4}, \ldots, A_{2M-1}$ (e.g., a second node and a fourth node) in the second sub-sequence of M intermediate voltage nodes numbered from M+1 to 2M of the first set of voltage nodes $A_1, \ldots, A_N$, and a second terminal coupled to the corresponding even-numbered intermediate voltage nodes $A_2, A_4, \ldots, A_M$ (e.g., a second node and a fourth node) in the first sub-sequence of M intermediate voltage nodes numbered from 1 to M of the first set of voltage nodes $A_1, \ldots, A_N$. The second group of the second subset of pumping capacitors also comprises the pumping capacitors $C_P/2$ which have a first terminal coupled to the odd-numbered intermediate voltage nodes $B_{M+1}, B_{M+3}, \ldots, B_{M-1}$ (e.g., a first node and a third node) in the second sub-sequence of M intermediate voltage nodes numbered from M+1 to 2M of the second set of voltage nodes $B_1, \ldots, B_N$, and a second terminal coupled to the corresponding odd-numbered intermediate voltage nodes $B_1, B_3, \ldots, B_{M-1}$ (e.g., a first node and a third node) in the first sub-sequence of M intermediate voltage nodes numbered from 1 to M of the second set of voltage nodes $B_1, \ldots, B_N$.

Generally, a last group of the first subset of pumping capacitors comprises the pumping capacitors $C_P/2$ which have a first terminal coupled to the odd-numbered intermediate voltage nodes $A_{N-M+1}, A_{N-M+3}, \ldots, A_{N-1}$ (e.g., a first node and a third node) in a last sub-sequence of M intermediate voltage nodes numbered from N−M+1 to N of the first set of voltage nodes $A_1, \ldots, A_N$, and a second terminal coupled to the corresponding odd-numbered intermediate voltage nodes $A_{N-2M+1}, A_{N-2M+3}, \ldots, A_{N-M-1}$ (e.g., a first node and a third node) in a second-to-last sub-sequence of M intermediate voltage nodes numbered from N−2M+1 to N−M of the first set of voltage nodes $A_1, \ldots, A_N$. The last group of the first subset of pumping capacitors also comprises the pumping capacitors $C_P/2$ which have a first terminal coupled to the even-numbered intermediate voltage nodes $B_{N-M+2}, B_{N-M+4}, \ldots, B_N$ (e.g., a second node and a fourth node) in the last sub-sequence of M intermediate voltage nodes numbered from N−M+1 to N of the second set of voltage nodes $B_1, \ldots, B_N$, and a second terminal coupled to the corresponding even-numbered intermediate voltage nodes $B_{N-2M+2}, B_{N-M+4}, \ldots, B_{N-M}$ (e.g., a second node and a fourth node) in the second-to-last sub-sequence of M intermediate voltage nodes numbered from N−2M+1 to N−M of the second set of voltage nodes $B_1, \ldots, B_N$.

Generally, a last group of the second subset of pumping capacitors comprises the pumping capacitors $C_P/2$ which have a first terminal coupled to the even-numbered intermediate voltage nodes $A_{N-M+2}, A_{N-M+4}, \ldots, A_N$ (e.g., a second node and a fourth node) in the last sub-sequence of M intermediate voltage nodes numbered from N−M+1 to N of the first set of voltage nodes $A_1, \ldots, A_N$, and a second terminal coupled to the corresponding even-numbered intermediate voltage nodes $A_{N-2M+2}, A_{N-M+4}, \ldots, A_{N-M}$ (e.g., a second node and a fourth node) in the second-to-last sub-sequence of M intermediate voltage nodes numbered from N−2M+1 to N−M of the first set of voltage nodes $A_1, \ldots, A_N$. The last group of the second subset of pumping capacitors also comprises the pumping capacitors $C_P/2$ which have a first terminal coupled to the odd-numbered intermediate voltage nodes $BN_{N-M+1}, B_{N-M+3}, \ldots, B_{N-1}$ (e.g., a first node and a third node) in the last sub-sequence of M intermediate voltage nodes numbered from N−M+1 to N of the second set of voltage nodes $B_1, \ldots, B_N$, and a second terminal coupled to the corresponding odd-numbered intermediate voltage nodes $B_{N-2M+1}, B_{N-2M+3}, \ldots, B_{N-M-1}$ (e.g., a first node and a third node) in a second-to-last sub-sequence of M intermediate voltage nodes numbered from N−2M+1 to N−M of the second set of voltage nodes $B_1, \ldots, B_N$.

It is noted that, while the architecture of FIG. 7 has been described with specific reference to a first, a second and a last group of pumping capacitors in each subset, the number of groups (i.e., the number K=N/M) of pumping capacitors may be varied according to design specification, with each group being "stacked" onto a previous one (see, for instance, the intermediate groups of capacitors coupled to nodes $A_{i+1}$, $B_{i+2}, A_{i+3}, B_{i+M}$ and $B_{i+1}, A_{i+2}, B_{i+3}, A_{i+M}$ in FIG. 7).

The open load voltage $V_O$ of a voltage multiplier circuit 70 is the same as reported in equation (2) if each pumping capacitor $C_P/2$ has a capacitance value which is half of the capacitance value of the pumping capacitors $C_P$ of a single branch architecture. The total amount of capacitance does not change between a single branch and dual branch architecture, insofar as the dual branch architecture comprises $2N*C_P/2$ capacitors, while the single branch architecture comprises $N*C_P$ capacitors. A dual branch architecture as exemplified in FIG. 7 may be advantageous insofar as the voltage ripple on the multiplier output, as well as the current peaks in the capacitors and diodes, are halved with respect to a single branch architecture.

Operation of a dual branch voltage multiplier 70 is similar to operation of a single branch architecture, with the voltages across the pumping capacitors that are halved, insofar as the architecture of FIG. 7 is symmetrical and, for a given N-stage multiplier, the number of pumping capacitors is double.

In the first group of pumping capacitors of the first subset (directly connected to node 44a and driven by signal $v_{CK}$) and in the first group of pumping capacitors of second subset (directly connected to node 44b and driven by signal $\overline{v_{CK}}$), the first two pumping capacitors (coupled between nodes 44a and $A_1$, and between nodes 44b and $B_1$, respectively) are charged at $V_{IN}-V_D$, the second pumping capacitors (coupled between nodes 44a and $B_2$, and between nodes 44b and $A_2$, respectively) are charged at $V_{IN}+V_{CK}-2V_D$, the third pumping capacitors (coupled between nodes 44a and $A_3$, and between nodes 44b and $B_3$, respectively) are charged at $V_{IN}+2V_{CK}-3V_D$, and so on, until the $M^{th}$ pumping capacitors (coupled between nodes 44a and $B_M$, and between nodes 44b and $A_M$, respectively, in case M is even; coupled between nodes 44a and $A_M$, and between nodes 44b and $B_M$, respectively, in case M is odd) that are charged at $V_{IN}+(M-1)\cdot V_{CK}-M\cdot V_D$. The pumping capacitors of the other groups, coupled to the intermediate voltage nodes numbered from M+1 to N, are all charged at $M\cdot(V_{CK}-V_D)$. The output capacitor is charged at $V_{IN}+N\cdot V_{CK}-(N+1)\cdot V_D$, as reported in equation (2) for the known multipliers and for the single branch architecture.

It is noted that the equivalent output resistance of a voltage multiplier circuit 70 can be computed as a combination of an M-stage Dickson multiplier and an N/M-stage Cockcroft-Walton multiplier, according to equation (8) below, provided that the clock period is much longer than the time constant $R_D C_P$, where $R_D$ is the diodes resistance:

$$R_{OUT} = \frac{1}{f \cdot C_P} \cdot M \sum_{i=1}^{\frac{N}{M}} i^2 \quad (8)$$

Concerning the silicon size, comparing equations (3) and (8) for the computation of $R_{OUT}$, it is noted that the size of an architecture as in FIG. 7 (also referred to as "hybrid dual" architecture hereinafter) can be expressed as:

$$Size_{Hybrid} = \frac{\sum_{i=1}^{N/M} i^2}{N/M} \cdot Size_{Dickson} \quad (9)$$

Figure 8:
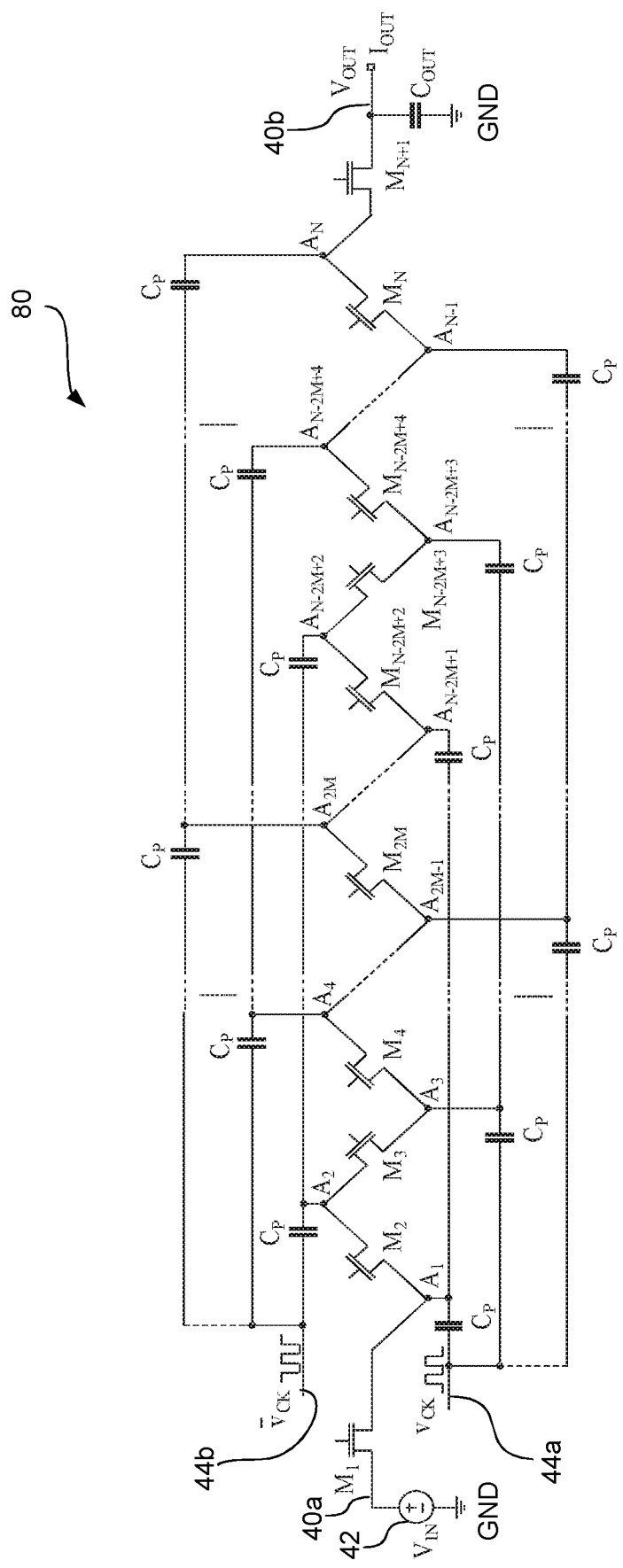
FIG. 8 is a circuit diagram exemplary of a voltage multiplier circuit having a single branch architecture according to one or more embodiments of the present description.

In one or more embodiments (e.g., in an on-chip implementation), diodes $D_1, \ldots, D_{N+1}$ may be replaced by MOS transistors as exemplified in FIG. 8. It will be noted that the voltage multiplier circuit 80 of FIG. 8 substantially corresponds to the architecture of FIG. 4, with diodes $D_1, \ldots, D_{N+1}$ replaced by MOS transistors $M_1, \ldots, M_{N+1}$. The MOS transistors can be n-channel and/or p-channel, as long as they are properly driven to be conductive from the input node towards the output node according to the current values of the clock signals $v_{CK}$ and $\overline{v_{CK}}$.

Figure 9:
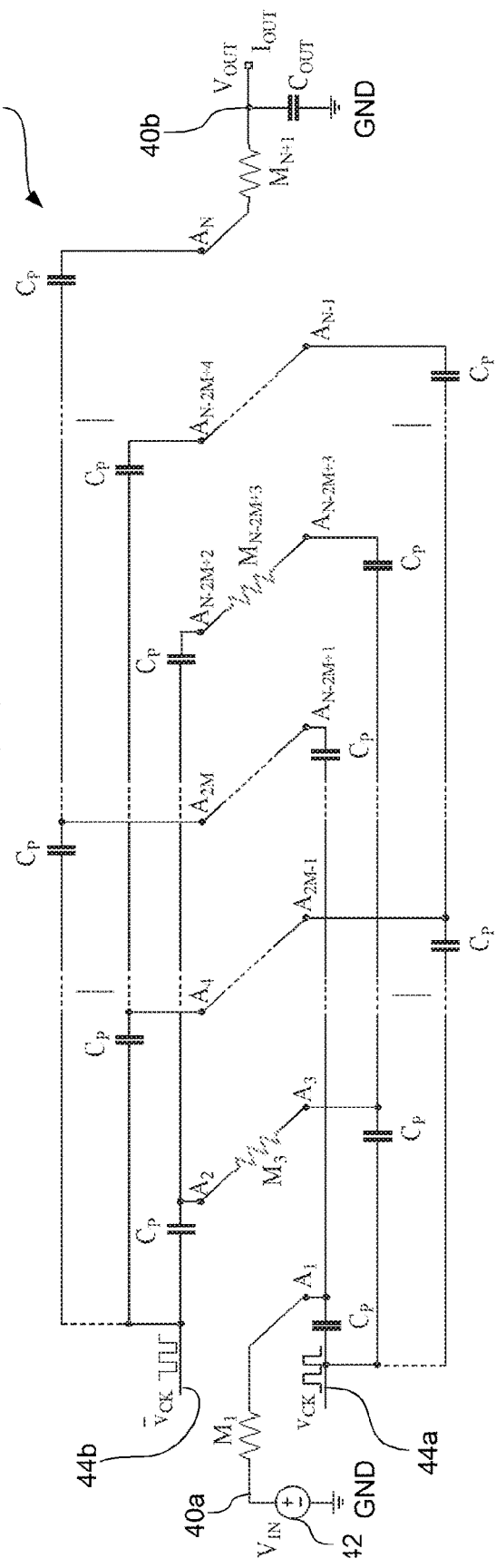
FIGS. 9 and 10 are circuit diagrams exemplary of operation of a voltage multiplier circuit according to FIG. 8.
Figure 10:
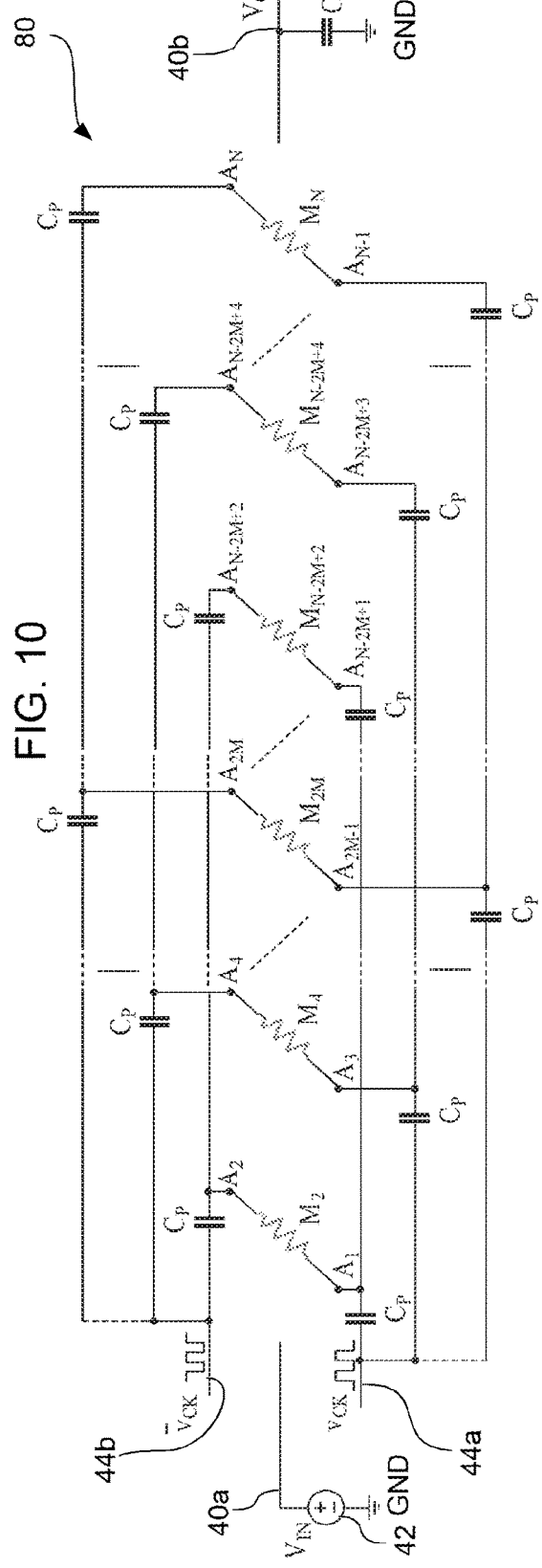

Operation of a voltage multiplier circuit 80 as exemplified in FIG. 8 is explained with reference to FIGS. 9 and 10. FIG. 9 is exemplary of charge transfer in the circuit 80 during a first half period of the clock signals $v_{CK}$ and $\overline{v_{CK}}$, in particular when $v_{CK}=0$ (low value) and $\overline{v_{CK}}=V_{CK}$ (high value). FIG. 10 is exemplary of charge transfer in the circuit 80 during a second half period of the clock signals $v_{CK}$ and $\overline{v_{CK}}$, in particular when $v_{CK}=V_{CK}$ (high value) and $\overline{v_{CK}}=0$ (low value).

In the first half clock period, when $v_{CK}$ is low and $\overline{v_{CK}}$ is high, the pumping capacitors driven by signal $v_{CK}$ are charged at a (more) positive voltage by the pumping capacitors driven by signal $\overline{v_{CK}}$, which are contextually discharged. The pumping capacitors driven by $v_{CK}$ receive the charge "packets" through the odd switches (MOS transistors), which are in a conductive state (turned on) in this phase, while the even switches (MOS transistors) are in a non-conductive state (turned off). In this phase, the first pumping capacitor is directly charged by the input voltage $V_{IN}$. In the second half clock period, when $v_{CK}$ is high and $\overline{v_{CK}}$ is low, the pumping capacitors driven by signal $v_{CK}$ are discharged by the pumping capacitors driven by signal $\overline{v_{CK}}$, which are contextually charged at a more positive voltage. The pumping capacitors driven by signal $v_{CK}$ provide the charge packets through the even switches (MOS transistors), which are in a conductive state (turned on) in this phase, while the odd switches (MOS transistors) are in a non-conductive state (turned off).

In the first group of pumping capacitors, directly connected to node 44a and driven by signal $v_{CK}$, the first pumping capacitor (coupled between node 44a and node $A_1$) is charged at $V_{IN}$, the third pumping capacitor (coupled between node 44a and node $A_3$) is charged at $V_{IN}+2V_{CK}$, the fifth pumping capacitor (coupled between node 44a and node $A_5$) is charged at $V_{IN}+4V_{CK}$, and so on, until the $(2M-1)^{th}$ pumping capacitor (coupled between node 44a and node $A_{2M-1}$) that is charged at $V_{IN}+(2M-2)\cdot V_{CK}$. In the second group of pumping capacitors, directly connected to node 44b and driven by signal $\overline{v_{CK}}$, the second pumping capacitor (coupled between node 44b and node $A_2$) is charged at $V_{IN}+V_{CK}$, the fourth pumping capacitor (coupled between node 44b and node $A_4$) is charged at $V_{IN}+3V_{CK}$, the sixth pumping capacitor (coupled between node 44b and node $A_6$) is charged at $V_{IN}+5V_{CK}$, and so on, until the $2M^{th}$ pumping capacitor (coupled between node 44b and node $A_2$) that is charged at $V_{IN}+(2M-1)\cdot V_{CK}$. The pumping capacitors from 2M+1 to N are all charged at $2M\cdot V_{CK}$; this is the voltage across the two terminals of the capacitors. The open load output voltage $V_O$ is reported in equation (10) below:

$$V_O = V_{IN} + N \cdot V_{CK} \quad (10)$$

It is noted that the equivalent output resistance of a voltage multiplier circuit 80 as exemplified in FIG. 8 is the same as defined in equation (6), provided that the clock period is much longer than the time constant $R_M C_P$, where $R_M$ is the MOS transistor resistance.

Figure 11:
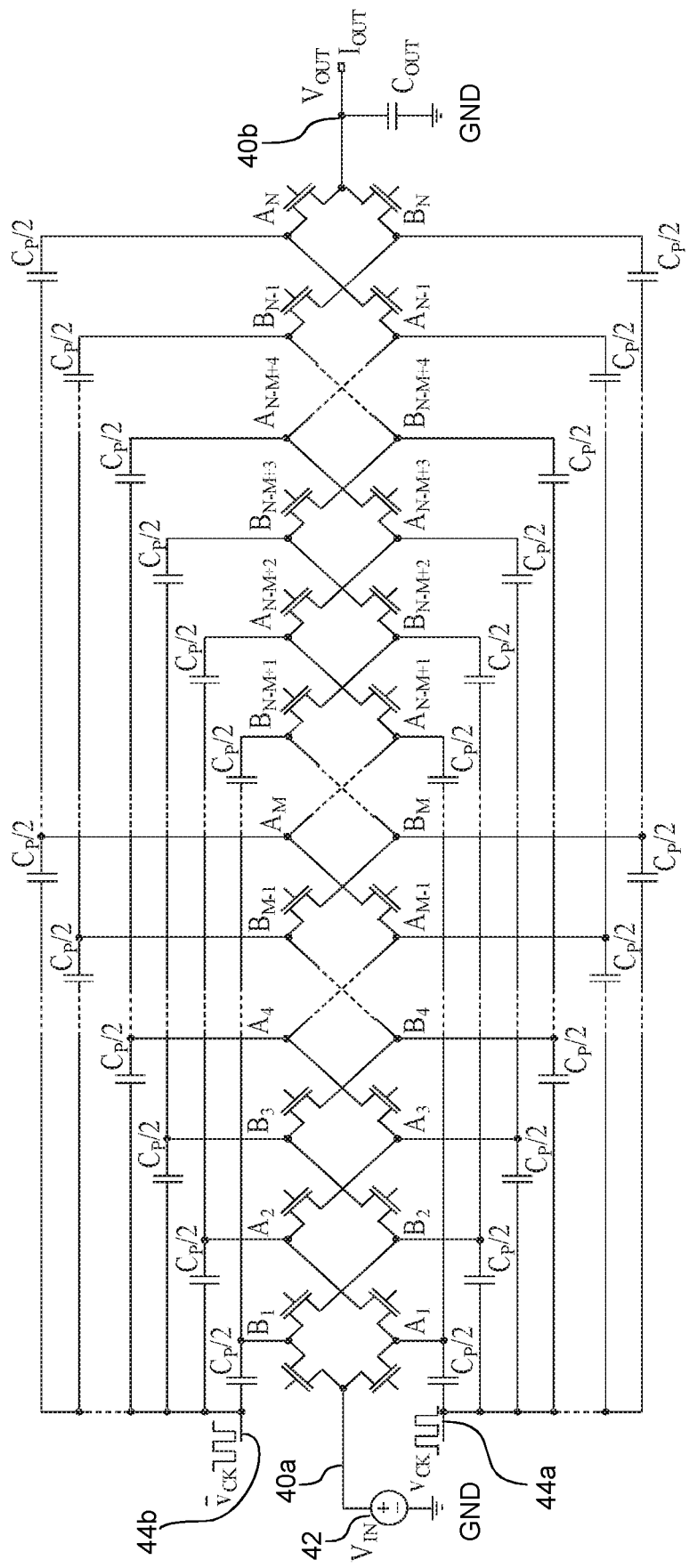
FIG. 11 is a circuit diagram exemplary of a voltage multiplier circuit having a dual branch architecture according to one or more embodiments of the present description.

In one or more embodiments, MOS transistors may be used to replace the diodes also in a dual branch architecture, as exemplified in FIG. 11. It will be noted that the voltage multiplier circuit 110 of FIG. 11 substantially corresponds to the architecture of FIG. 7, with diodes replaced by MOS transistors. The MOS transistors can be n-channel and/or p-channel, as long as they are properly driven (e.g., according to the driving scheme discussed with reference to FIGS. 9 and 10, if a positive output voltage is to be generated).

It is noted that the equivalent output resistance of a voltage multiplier circuit no as exemplified in FIG. 11 is the same as defined in equation (8), provided that the clock period is much longer than the time constant $R_M C_P$, where $R_M$ is the MOS transistor resistance. Also, the open load voltage $V_O$ of a voltage multiplier circuit no as exemplified in FIG. 11 is the same as defined in equation (10). A dual branch MOS architecture as exemplified in FIG. 11 may be advantageous insofar as the voltage ripple on the multiplier output, as well as the current peaks in the capacitors and MOS transistors, are halved with respect to a single branch MOS architecture.

Figure 12:
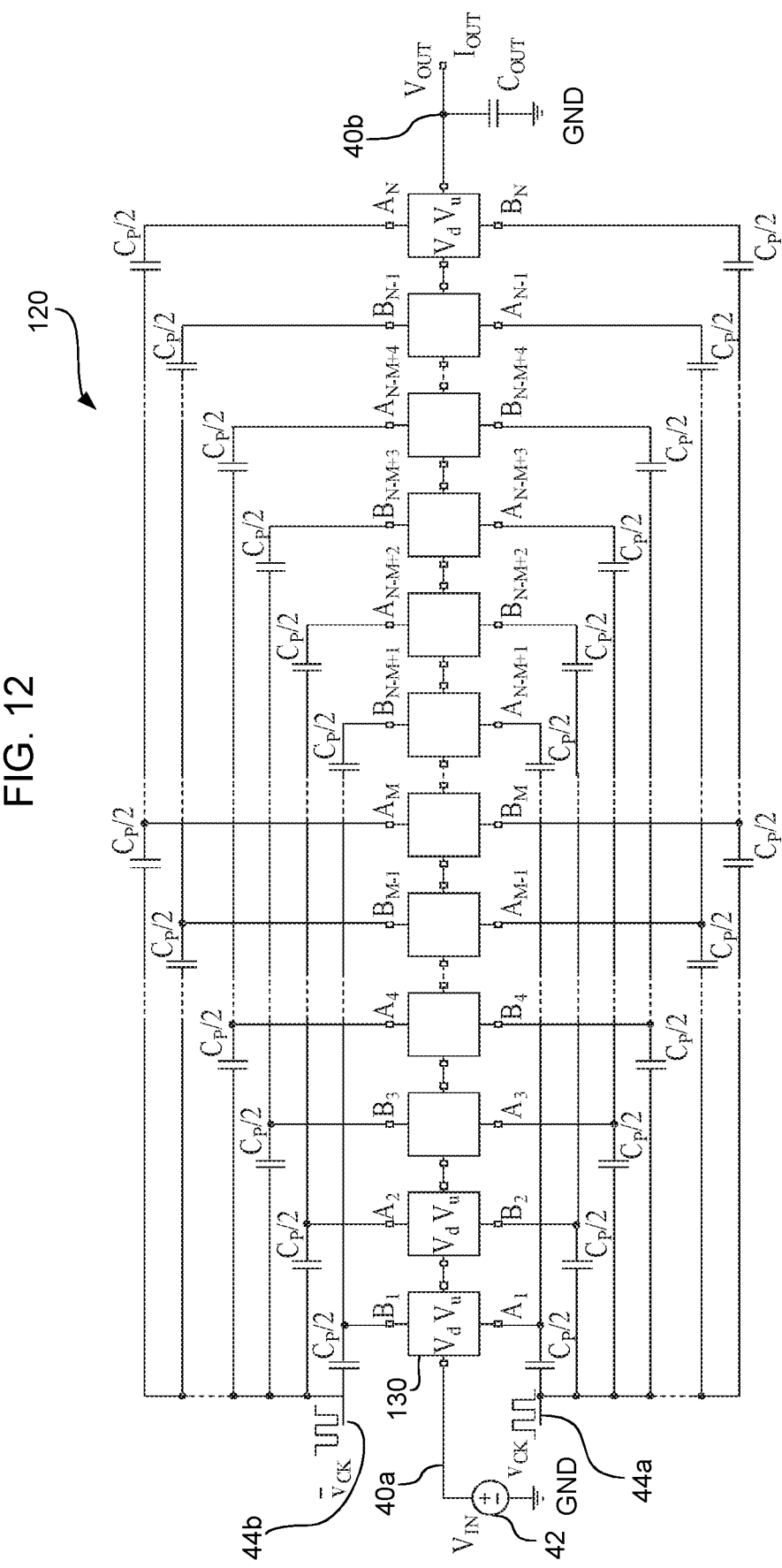
FIG. 12 is a circuit diagram exemplary of a voltage multiplier circuit having a dual branch architecture for generating positive voltages according to one or more embodiments of the present description.

Generally, a dual branch voltage multiplier circuit for generating positive voltages may be implemented as exemplified by the circuit diagram of FIG. 12.

Figure 13:
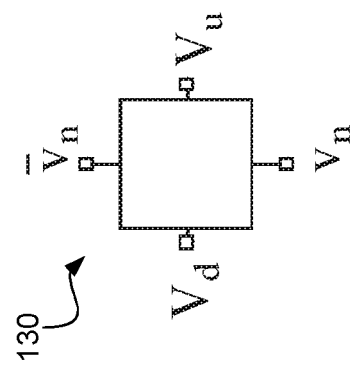

As exemplified in FIG. 12, a voltage multiplier circuit 120 comprises a chain of N charge transfer circuit blocks 130 arranged between the input node 40a and the output node 40b. Each charge transfer circuit block 130 has an input terminal $V_d$, an output terminal $V_u$, a first control terminal and a second control terminal, as exemplified in FIG. 13. The charge transfer circuit block 130 comprises electronic components (e.g., diodes and/or transistors) arranged so that charge is transferred from the input terminal $V_d$ to the output terminal $V_u$ when two switching signals in phase opposition are applied to the first and second control terminals. In particular, depending on the values of the control signals received at the two control terminals, the circuit block 130 may operate in two distinct commutation states: in a first state, the input terminal $V_d$ is coupled to the first control terminal and the output terminal $V_u$ is coupled to the second control terminal; in a second state, the input terminal $V_d$ is coupled to the second control terminal and the output terminal $V_u$ is coupled to the first control terminal.

As exemplified in FIG. 12, the first control terminal and the second control terminal of each charge transfer circuit block 130 are configured to receive complementary control signals (e.g., $v_{CK}$ and $\overline{v_{CK}}$) via respective pumping capacitors $C_P/2$. As exemplified in FIG. 12, the N charge transfer circuit blocks 130 are arranged in a number K=N/M of sub-chains, each sub-chain comprising a string of M blocks 130.

In the first sub-chain of blocks 130, the first control terminal of each block 130 is coupled via a respective pumping capacitor $C_P/2$ to the first drive input node 44a, and the second control terminal of each block 130 is coupled via a respective pumping capacitor $C_P/2$ to the second drive input node 44b. In the second sub-chain of blocks 130, the first control terminal of each block 130 is coupled via a respective pumping capacitor $C_P/2$ to the first control terminal of a corresponding block 130 in the first sub-chain, and the second control terminal of each block 130 is coupled via a respective pumping capacitor $C_P/2$ to the second control terminal of a corresponding block 130 in the first sub-chain. In other terms, the pumping capacitors coupled to the blocks 130 in the second sub-chain are stacked to the pumping capacitors coupled to the blocks 130 in the first sub-chain.

The number K of sub-chains depends on the number N of stages and on the number M of blocks in each sub-chain. Generally, in the $j^{th}$ sub-chain of blocks 130, the first control terminal of each block 130 is coupled via a respective pumping capacitor $C_P/2$ to the first control terminal of a corresponding block 130 in the $(j-1)^{th}$ sub-chain, and the second control terminal of each block 130 is coupled via a respective pumping capacitor $C_P/2$ to the second control terminal of a corresponding block 130 in the (j-1)th sub-chain.

Figure 14:
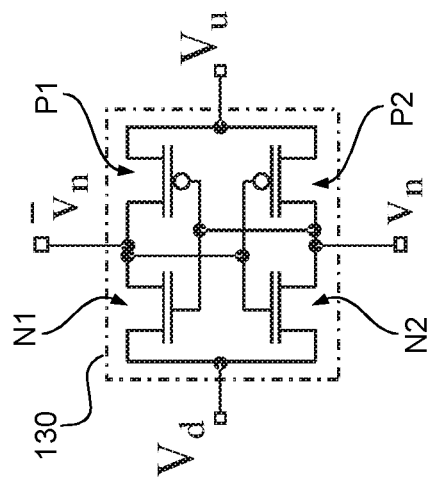
FIGS. 13 and 14 are circuit diagrams exemplary of implementation details of a voltage multiplier circuit according to FIG. 12.

For instance, in one or more embodiments each charge transfer circuit block 130 may comprise an arrangement as exemplified in FIG. 14. The arrangement comprises a first re-channel transistor $N_1$ having a current path between the input terminal $V_d$ and the first control terminal, a second n-channel transistor $N_2$ having a current path between the input terminal $V_d$ and the second control terminal, a first p-channel transistor $P_1$ having a current path between the output terminal $V_u$ and the first control terminal, and a second p-channel transistor $P_2$ having a current path between the output terminal $V_u$ and the second control terminal. The gate terminals of the first n-channel transistor $N_1$ and first p-channel transistor $P_1$ are coupled to the second control terminal, and the gate terminals of the second n-channel transistor $N_2$ and second p-channel transistor $P_2$ are coupled to the first control terminal.

Operation of such an arrangement is disclosed in documents [Pulvirenti] and [Gariboldi 96] for use in a latched charge pump, and therefore will not be repeated herein for the sake of brevity.

One or more embodiments may be used to generate negative voltages. This can be obtained, for instance, inverting the polarity of the diodes in the architectures of FIGS. 4 and 7, as exemplified respectively in the circuit diagrams of FIGS. 15 and 16, or inverting the polarity of the activation signals of the MOS transistors in the architectures of FIGS. 8 and 11, or inverting the direction of (e.g., flipping) the charge transfer circuit blocks 130 in the architecture of FIG. 12 (e.g., swapping the terminals $V_u$ and $V_d$), as exemplified in the circuit diagram of FIG. 17.

Figure 15:
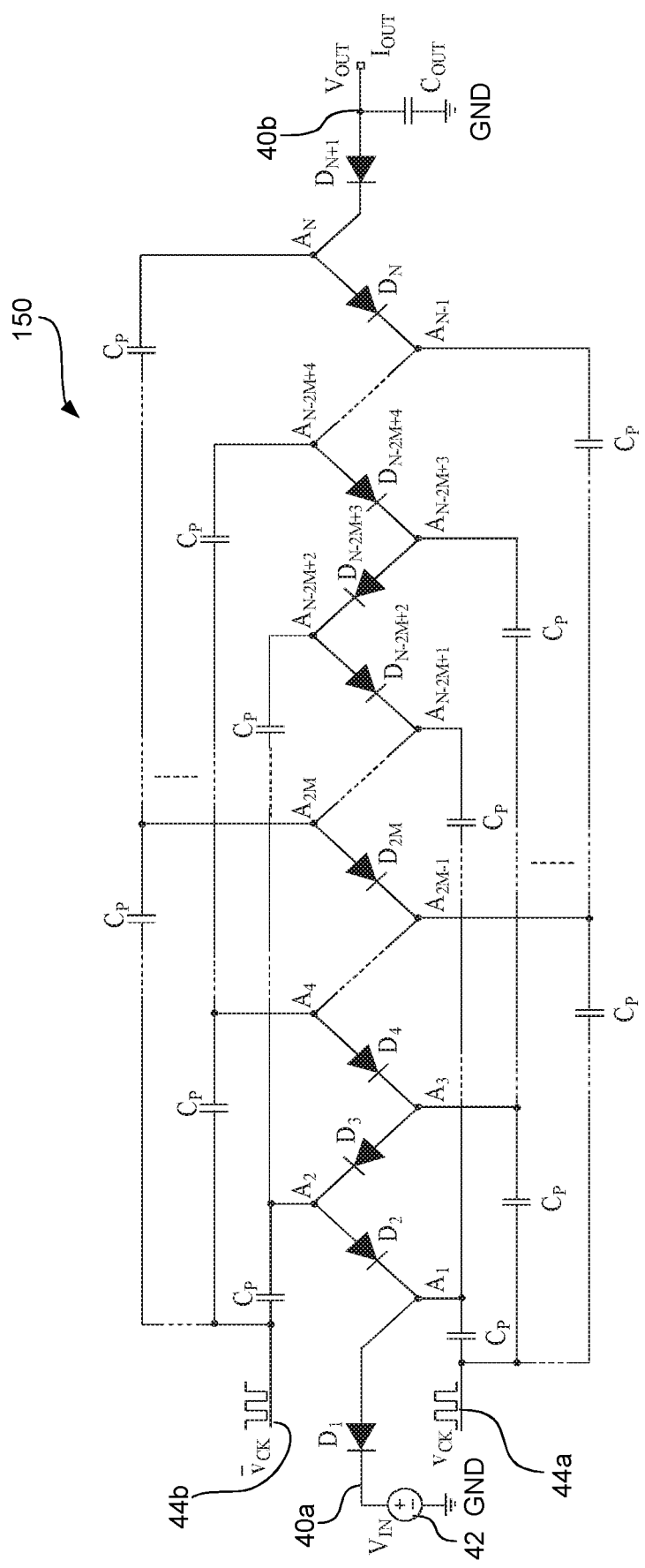
FIG. 15 is a circuit diagram exemplary of a voltage multiplier circuit having a single branch architecture for generating negative voltages according to one or more embodiments of the present description.

Operation of a single branch, negative voltage multiplier circuit 150 as exemplified in FIG. 15 is similar to the operation of a single branch, positive voltage multiplier circuit 40 as exemplified in FIG. 4, and is therefore discussed in the following merely by way of example. In the first half clock period, when $v_{CK}$ is low and $\overline{v_{CK}}$ is high, the pumping capacitors driven by signal $v_{CK}$ (i.e., coupled to odd-numbered intermediate voltage nodes $A_1, \ldots, A_{N-1}$) are charged. They receive the charge "packets" through the even diodes from the pumping capacitors driven by signal $\overline{v_{CK}}$ (i.e., coupled to even-numbered intermediate voltage nodes $A_2, \ldots, A_N$) which are contextually discharged at a more negative voltage. In the second half clock period, when $v_{CK}$ is high and $\overline{v_{CK}}$ is low, the pumping capacitors driven by signal $v_{CK}$ are discharged at a more negative voltage. They provide the charge packets through the odd diodes to the pumping capacitors driven by signal $\overline{v_{CK}}$, which are contextually charged. In this phase, the first pumping capacitor is directly discharged to the input voltage $V_{IN}$.

The first pumping capacitor (coupled between node 44a and node $A_1$) is charged at $V_{IN}-V_{CK}+V_D$, the second pumping capacitor (coupled between node 44b and node $A_2$) is charged at $V_{IN}-2V_{CK}+2V_D$, the third pumping capacitor (coupled between node 44a and node $A_3$) is charged at $V_{IN}-3V_{CK}+3V_D$, and so on. In the single branch architecture, the pumping capacitors from 2M to N are all charged at $-2M \cdot (V_{CK}-V_D)$; in the dual branch architecture, the pumping capacitors from M to N are all charged at $-M \cdot (V_{CK}-V_D)$. The open load output voltage $V_O$ is reported in equation (11) below:

$$V_O = V_{IN} - N \cdot V_{CK} + (N+1) \cdot V_D \qquad (11)$$

It is noted that the equivalent output resistance of a voltage multiplier circuit 150 is the same as reported in equation (6).

It is also noted that connecting the first diode to ground rather than to $V_{IN}$, the output voltage becomes more negative.

Figure 16:
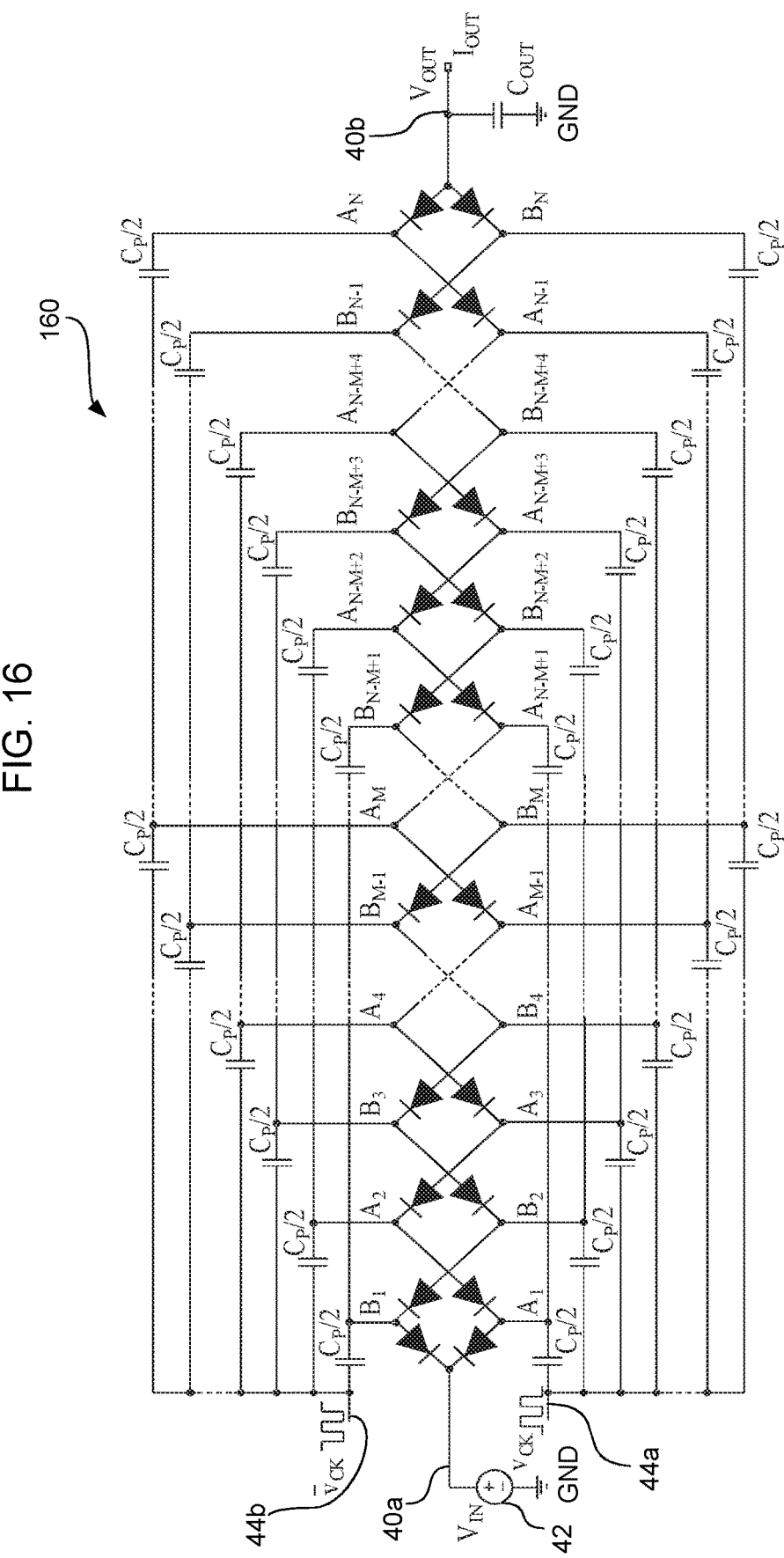
FIG. 16 is a circuit diagram exemplary of a voltage multiplier circuit having a dual branch architecture for generating negative voltages according to one or more embodiments of the present description.
Figure 17:
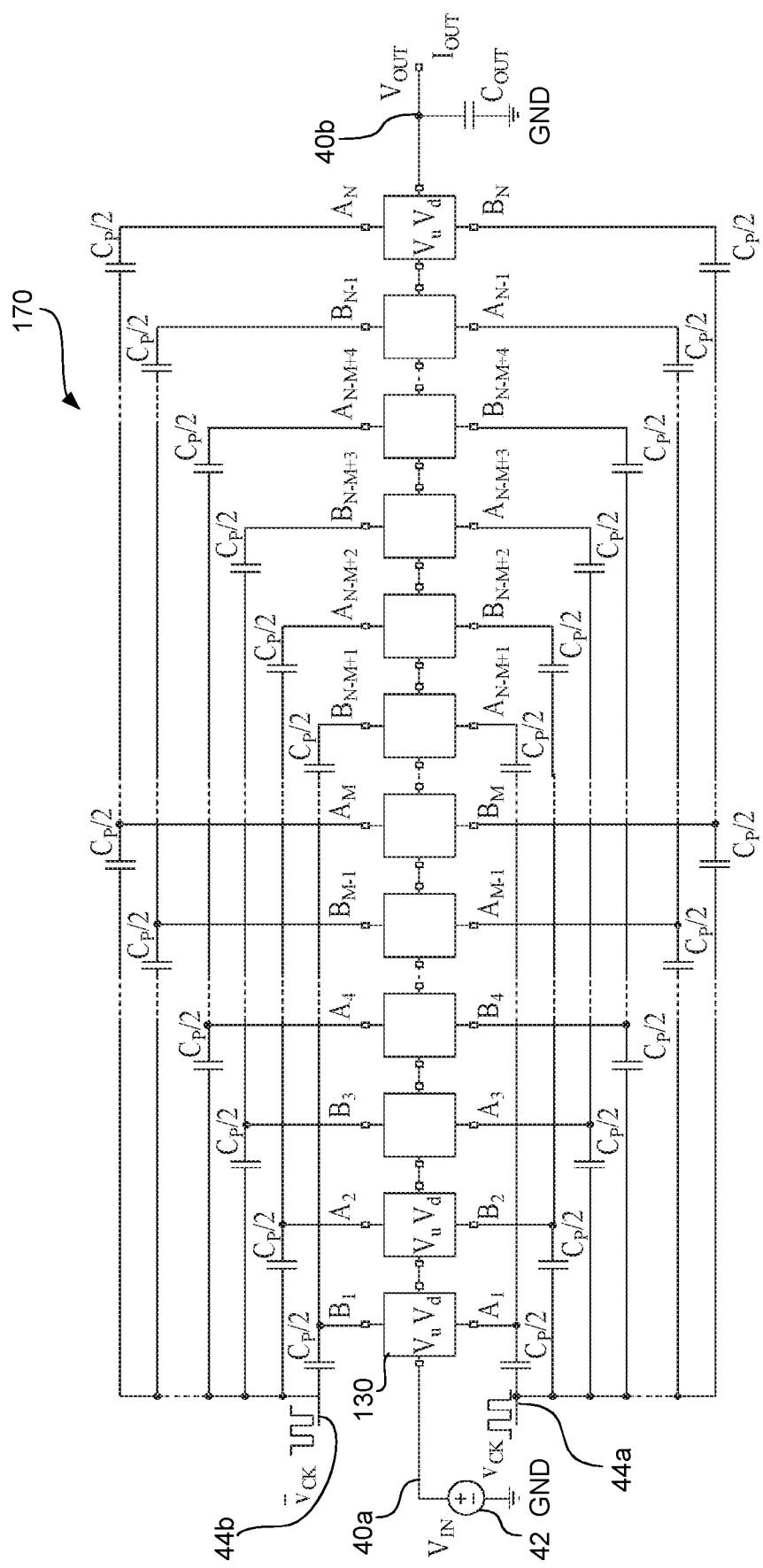
FIG. 17 is a circuit diagram exemplary of a voltage multiplier circuit having a dual branch architecture for generating negative voltages according to one or more embodiments of the present description.

Operation of a dual branch negative voltage multiplier 160 as exemplified in FIG. 16 is similar to operation of a single branch negative architecture, with the voltages across the pumping capacitors that are halved, and will not be further described herein for the sake of brevity.

Operation of a negative voltage multiplier circuit based on a MOS transistor architecture as exemplified in FIG. 8 may be obtained by inverting the operation previously explained with reference to FIGS. 9 and 10, i.e., inverting the activation phases of the MOS transistors with respect to the two semi-periods of the clock signals. In that case, in the first half clock period, when $v_{CK}$ is low and $\overline{v_{CK}}$ is high, the pumping capacitors driven by signal $v_{CK}$ are charged by the pumping capacitors driven by signal $\overline{v_{CK}}$, which are contextually discharged at a more negative voltage. The pumping capacitors driven by $v_{CK}$ receive the charge "packets" through the even switches (MOS transistors), which are in a conductive state (turned on) in this phase, while the odd switches (MOS transistors) are in a non-conductive state (turned off). In the second half clock period, when $v_{CK}$ is high and $\overline{v_{CK}}$ is low, the pumping capacitors driven by signal $v_{CK}$ are discharged at a more negative voltage by the pumping capacitors driven by signal $\overline{v_{CK}}$, which are contextually charged. The pumping capacitors driven by signal $v_{CK}$ provide the charge packets through the odd switches (MOS transistors), which are in a conductive state (turned on) in this phase, while the even switches (MOS transistors) are in a non-conductive state (turned off). In this phase, the first pumping capacitor is directly discharged to the input voltage $V_{IN}$.

The first pumping capacitor (coupled between node 44a and node $A_1$) is charged at $V_{IN}-V_{CK}$, the second pumping capacitor (coupled between node 44b and node $A_2$) is charged at $V_{IN}-2V_{CK}$, the third pumping capacitor (coupled between node 44a and node $A_3$) is charged at $V_{IN}-3V_{CK}$, and so on. In the single branch architecture, the pumping capacitors from 2M to N are all charged at $-2M \cdot V_{CK}$; in the dual branch architecture, the pumping capacitors from M to N are all charged at $-M \cdot V_{CK}$. The open load output voltage $V_O$ is reported in equation (12) below:

$$V_O = V_{IN} - N \cdot V_{CK} \tag{12}$$

The equivalent output resistance is the same as defined in equation (6).

The operation of a dual branch negative voltage multiplier with MOS transistors is similar to the operation of the single branch one, and will thus not be further described for the sake of brevity.

Tables I and II provided at the end of the description summarize the formulas of the open load voltage $V_O$, the output resistance $R_{OUT}$ and the total capacitance amount $C_{TOT}$ of the voltage multipliers circuits discussed herein.

One or more embodiments may be applied, purely by way of example, to a monolithic octal driver for MEMS (Micro Electro Mechanical Systems) switches, where a supply rail $V_{OUT}=70$ V for the drivers is generated starting from a power supply $V_{DD}=3.3$ V. For instance, one or more embodiments may be implemented using a silicon-on-insulator (SOI) technology, such as SOI-BCD6s technology, with pumping capacitors having 12 V operative voltage. Considering a regulated power supply of 3.0 V, such an exemplary multiplier may have almost N=24 stages. Moreover, assuming $V_{IN}=V_{CK}=3.0$ V, M can be selected dividing the operating voltage of the pumping capacitors (e.g., 12 V) by the regulated power supply (e.g., 3.0 V). So far, M can be equal to 4, as the maximum voltage on the pumping capacitors would not exceed the operating value of 12 V. From equation (9) with M=1, a 24 N-Stage Cockcroft-Walton multiplier would be 204 times bigger than a Dickson one, while from equation (9) with M=4, a multiplier according to one or more embodiments having 24 N-Stage and 4 M-Stage would be 15.2 times bigger than a Dickson one and 13.4 times smaller than a Cockcroft-Walton one.

One or more embodiments may thus provide an integrated voltage multiplier circuit with reduced silicon area occupation.

Without prejudice to the underlying principles, the details and embodiments may vary, even significantly, with respect to what has been described by way of example only, without departing from the extent of protection.

The extent of protection is determined by the annexed claims.

TABLE I

| Multiplier type | Multiplier with diodes | Multiplier with MOS transistors |
|---|---|---|
| Positive voltage | $V_O = V_{IN} + N \cdot V_{CK} - (N+1) \cdot V_D$ | $V_O = V_{IN} + N \cdot V_{CK}$ |
| Negative voltage | $V_O = V_{IN} - N \cdot V_{CK} + (N+1) \cdot V_D$ | $V_O = V_{IN} - N \cdot V_{CK}$ |

TABLE II

| Multiplier type | Output resistance | Total capacitance amount |
|---|---|---|
| Dickson | $R_{OUT} = \dfrac{1}{f \cdot C_P} \cdot N$ | $C_{TOT} = \dfrac{1}{f \cdot R_{OUT}} \cdot N^2$ |
| Cockcroft-Walton dual branch | $R_{OUT} = \dfrac{1}{f \cdot C_P} \cdot \sum_{i=1}^{N} i^2$ | $C_{TOT} = \dfrac{1}{f \cdot R_{OUT}} \cdot N \cdot \sum_{i=1}^{N} i^2$ |
| Hybrid dual branch | $R_{OUT} = \dfrac{1}{f \cdot C_P} \cdot M \cdot \sum_{i=1}^{N/M} i^2$ | $C_{TOT} = \dfrac{1}{f \cdot R_{OUT}} \cdot N \cdot M \cdot \sum_{i=1}^{N/M} i^2$ |

What is claimed is:

1. A voltage multiplier circuit comprising:
a first input node and a second input node configured to be coupled to a voltage source to receive an input voltage therebetween;
a first output node and a second output node configured to be coupled to an output capacitor to produce an output voltage across the output capacitor;
a first input control node configured to receive a first clock signal and a second input control node configured to receive a second clock signal, the second clock signal being in phase opposition to the first clock signal, wherein the voltage multiplier circuit switches between a first commutation state and a second commutation state as a function of the values of the first clock signal and the second clock signal;
an ordered sequence of intermediate voltage nodes arranged between the first input node and the first output node, the ordered sequence comprising a first ordered sub-sequence of intermediate voltage nodes and a second ordered sub-sequence of intermediate voltage nodes;
a respective capacitor coupled between each odd-numbered intermediate voltage node in the first ordered sub-sequence of the ordered sequence and the first input control node, wherein a first intermediate voltage node in the first ordered sub-sequence is configured to be selectively couplable to the first input node;

a respective capacitor coupled between each even-numbered intermediate voltage node in the first ordered sub-sequence of the ordered sequence and the second input control node;
a respective capacitor coupled between each odd-numbered intermediate voltage node in the second ordered sub-sequence of the ordered sequence and a corresponding odd-numbered intermediate voltage node in the first ordered sub-sequence of the ordered sequence;
a respective capacitor coupled between each even-numbered intermediate voltage node in the second ordered sub-sequence of the ordered sequence and a corresponding even-numbered intermediate voltage node in the first ordered sub-sequence of the ordered sequence; and
a first plurality of selectively conductive electronic components coupled to the intermediate voltage nodes of the ordered sequence, wherein:
in the first commutation state of the voltage multiplier circuit, the first plurality of selectively conductive electronic components is configured to provide electrically-conductive paths between each of the even-numbered intermediate voltage nodes of the ordered sequence and a respective next odd-numbered intermediate voltage node of the ordered sequence, an electrically-conductive path between the first input node and the first intermediate voltage node of the ordered sequence, and an electrically-conductive path between a last intermediate voltage node of the ordered sequence and the first output node, and
in the second commutation state of the voltage multiplier circuit, the first plurality of selectively conductive electronic components is configured to provide electrically-conductive paths between each of the odd-numbered intermediate voltage nodes of the ordered sequence and a respective next even-numbered intermediate voltage node of the ordered sequence.

2. The voltage multiplier circuit of claim 1, further comprising:
a further ordered sequence of intermediate voltage nodes arranged between the first input node and the first output node, the further ordered sequence comprising a respective first ordered sub-sequence of intermediate voltage nodes and a respective second ordered sub-sequence of intermediate voltage nodes;
a respective capacitor coupled between each odd-numbered intermediate voltage node in the first ordered sub-sequence of the further ordered sequence and the second input control node, wherein a first intermediate voltage node in the first ordered sub-sequence of the further ordered sequence is configured to be selectively couplable to the first input node;
a respective capacitor coupled between each even-numbered intermediate voltage node in the first ordered sub-sequence of the further ordered sequence and the first input control node;
a respective capacitor connected between each odd-numbered intermediate voltage node in the second ordered sub-sequence of the further ordered sequence and a corresponding odd-numbered intermediate voltage node in the first ordered sub-sequence of the further ordered sequence; and
a respective capacitor coupled between each even-numbered intermediate voltage node in the second ordered sub-sequence of the further ordered sequence and a corresponding even-numbered intermediate voltage node in the first ordered sub-sequence of the further ordered sequence; and
a further plurality of selectively conductive electronic components coupled to the intermediate voltage nodes of the further ordered sequence, wherein:
in the first commutation state of the voltage multiplier circuit, the further plurality of selectively conductive electronic components is configured to provide electrically-conductive paths between each of the odd-numbered intermediate voltage nodes of the further ordered sequence and a respective next even-numbered intermediate voltage node of the further ordered sequence, and
in the second commutation state of the voltage multiplier circuit, the further plurality of selectively conductive electronic components is configured to provide electrically-conductive paths between each of the even-numbered intermediate voltage nodes of the further ordered sequence and a respective next odd-numbered intermediate voltage node of the further ordered sequence, an electrically-conductive path between the first input node and the first intermediate voltage node of the further ordered sequence, and an electrically-conductive path between a last intermediate voltage node of the further ordered sequence and the first output node.

3. The voltage multiplier circuit of claim 2, wherein the first plurality of selectively conductive electronic components and the further plurality of selectively conductive electronic components include a string of latched charge pump cells arranged between the first input node and the first output node.

4. The voltage multiplier circuit of claim 2, wherein the first plurality of selectively conductive electronic components comprises a p-channel transistor and an n-channel transistor arranged in the current path between each pair of subsequent intermediate voltage nodes of the ordered sequence, and wherein the further plurality of selectively conductive electronic components comprises a further p-channel transistor and a further n-channel transistor arranged in the current path between each pair of subsequent further intermediate voltage nodes of the further ordered sequence.

5. The voltage multiplier circuit of claim 4, wherein:
a control terminal of the p-channel transistor is coupled to an mth intermediate voltage node of the further ordered sequence of intermediate voltage nodes and a control terminal of the n-channel transistor is coupled to an (m+1)th intermediate voltage node of the further ordered sequence of intermediate voltage nodes; and
a control terminal of the further p-channel transistor is coupled to an mth intermediate voltage node of the ordered sequence of intermediate voltage nodes and a control terminal of the further n-channel transistor is coupled to an (m+1)th intermediate voltage node of the ordered sequence of intermediate voltage nodes.

6. The voltage multiplier circuit of claim 4, wherein:
a control terminal of the p-channel transistor is coupled to the (m+1)th intermediate voltage node of the further ordered sequence of intermediate voltage nodes and a control terminal of the n-channel transistor is coupled to the mth intermediate voltage node of the further ordered sequence of intermediate voltage nodes; and
a control terminal of the further p-channel transistor is coupled to the (m+1)th intermediate voltage node of the ordered sequence of intermediate voltage nodes and a control terminal of the further n-channel transistor is coupled to the mth intermediate voltage node of the ordered sequence of intermediate voltage nodes.

7. The voltage multiplier circuit of claim 1, wherein the first plurality of selectively conductive electronic components comprises diodes arranged in a string between the first input node and the first output node, and wherein the intermediate voltage nodes are located between subsequent diodes of the string.

8. The voltage multiplier circuit of claim 7, wherein the diodes are arranged to be selectively conductive from the first input node towards the first output node.

9. The voltage multiplier circuit of claim 7, wherein the diodes are arranged to be selectively conductive from the first output node towards the first input node.

10. The voltage multiplier circuit of claim 1, wherein the ordered sequence of intermediate voltage nodes comprises at least one third ordered sub-sequence of intermediate voltage nodes, the voltage multiplier circuit further comprising:
  a respective capacitor coupled between each odd-numbered intermediate voltage node in the at least one third ordered sub-sequence of the ordered sequence and a corresponding odd-numbered intermediate voltage node in a preceding ordered sub-sequence of the ordered sequence; and
  a respective capacitor coupled between each even-numbered intermediate voltage node in the at least one third ordered sub-sequence of the ordered sequence and a corresponding even-numbered intermediate voltage node in the preceding ordered sub-sequence of the ordered sequence.

11. The voltage multiplier circuit of claim 1, further comprising:
  a first clock generator coupled to the first input control node, the first clock generator configured to produce the first clock signal; and
  a second clock generator coupled to the second input control node, the second clock generator configured to produce the second clock signal in phase opposition to the first clock signal.

12. The voltage multiplier circuit of claim 1, wherein the voltage multiplier circuit is implemented in a semiconductor chip, and wherein the capacitors are integrated in the semiconductor chip.

13. An integrated circuit comprising:
  an input node configured to receive an input voltage;
  an output node configured to be coupled to an output capacitor and configured to produce an output voltage higher than the input voltage;
  a first input control node configured to receive a first clock signal;
  a second input control node configured to receive a second clock signal, the second clock signal being in phase opposition to the first clock signal, wherein the integrated circuit switches between a first commutation state and a second commutation state as a function of the first and second clock signals;
  an ordered sequence of intermediate voltage nodes arranged between the input node and the output node, the ordered sequence comprising a first ordered sub-sequence of intermediate voltage nodes and a second ordered sub-sequence of intermediate voltage nodes;
  a respective capacitor coupled between each odd-numbered intermediate voltage node in the first ordered sub-sequence of the ordered sequence and the first input control node, wherein a first intermediate voltage node in the first ordered sub-sequence is configured to be selectively couplable to the input node;
  a respective capacitor coupled between each even-numbered intermediate voltage node in the first ordered sub-sequence of the ordered sequence and the second input control node;
  a respective capacitor coupled between each odd-numbered intermediate voltage node in the second ordered sub-sequence of the ordered sequence and a corresponding odd-numbered intermediate voltage node in the first ordered sub-sequence of the ordered sequence;
  a respective capacitor coupled between each even-numbered intermediate voltage node in the second ordered sub-sequence of the ordered sequence and a corresponding even-numbered intermediate voltage node in the first ordered sub-sequence of the ordered sequence; and
  a first plurality of selectively conductive electronic components coupled to the intermediate voltage nodes of the ordered sequence, wherein:
  in the first commutation state, the first plurality of selectively conductive electronic components is configured to provide electrically-conductive paths between each of the even-numbered intermediate voltage nodes of the ordered sequence and a respective next odd-numbered intermediate voltage node of the ordered sequence, an electrically-conductive path between the input node and the first intermediate voltage node of the ordered sequence, and an electrically-conductive path between a last intermediate voltage node of the ordered sequence and the output node, and
  in the second commutation state, the first plurality of selectively conductive electronic components is configured to provide electrically-conductive paths between each of the odd-numbered intermediate voltage nodes of the ordered sequence and a respective next even-numbered intermediate voltage node of the ordered sequence.

14. The integrated circuit of claim 13, wherein the first plurality of selectively conductive electronic components comprises a plurality of diodes arranged in a string between the input node and the output node.

15. The integrated circuit of claim 14, wherein each diode of the plurality of diodes is implemented with a transistor.

16. The integrated circuit of claim 13, wherein each of the first plurality of selectively conductive electronic components comprises:
  first, second, third, and fourth nodes;
  a first n-channel transistor having a current path coupled between the first and third nodes;
  a first p-channel transistor having a current path coupled between the third and second nodes;
  a second n-channel transistor having a current path coupled between the first and fourth nodes; and
  a second p-channel transistor having a current path coupled between the fourth and second nodes, wherein the third node is coupled to the second input control node, and wherein the fourth node is coupled to the first input control node.

17. The integrated circuit of claim 13, wherein the first plurality of selectively conductive electronic components comprises diodes arranged in a string between the first input node and the first output node, and wherein the intermediate voltage nodes are located between subsequent diodes of the string.

18. The integrated circuit of claim 17, wherein the diodes are arranged to be selectively conductive from the first input node towards the first output node.

19. The integrated circuit of claim 17, wherein the diodes are arranged to be selectively conductive from the first output node towards the first input node.

20. A method comprising:
- receiving an input voltage at an input node;
- generating an output voltage at an output node that is coupled to an output capacitor, the output voltage being higher than the input voltage, wherein an ordered sequence of intermediate voltage nodes is arranged between the input node and the output node, the ordered sequence comprising a first ordered sub-sequence of intermediate voltage nodes and a second ordered sub-sequence of intermediate voltage nodes, wherein a respective capacitor is coupled between each odd-numbered intermediate voltage node in the second ordered sub-sequence of the ordered sequence and a corresponding odd-numbered intermediate voltage node in the first ordered sub-sequence of the ordered sequence, wherein a respective capacitor is coupled between each even-numbered intermediate voltage node in the second ordered sub-sequence of the ordered sequence and a corresponding even-numbered intermediate voltage node in the first ordered sub-sequence of the ordered sequence, and wherein a first plurality of selectively conductive electronic components is coupled to the intermediate voltage nodes of the ordered sequence;
- receiving a first clock signal at a first input control node, wherein a respective capacitor is coupled between each odd-numbered intermediate voltage node in the first ordered sub-sequence of the ordered sequence and the first input control node, wherein a first intermediate voltage node in the first ordered sub-sequence is selectively couplable to the input node;
- receiving a second clock signal at a second input control node, the second clock signal being in phase opposition to the first clock signal, wherein a respective capacitor is coupled between each even-numbered intermediate voltage node in the first ordered sub-sequence of the ordered sequence and the second input control node;
- switching between a first commutation state and a second commutation state based on the first and second clock signals;
- in the first commutation state, providing, using the first plurality of selectively conductive electronic components, electrically-conductive paths between each of the even-numbered intermediate voltage nodes of the ordered sequence and a respective next odd-numbered intermediate voltage node of the ordered sequence, an electrically-conductive path between the input node and the first intermediate voltage node of the ordered sequence, and an electrically-conductive path between a last intermediate voltage node of the ordered sequence and the output node; and
- in the second commutation state, providing, using the first plurality of selectively conductive electronic components, electrically-conductive paths between each of the odd-numbered intermediate voltage nodes of the ordered sequence and a respective next even-numbered intermediate voltage node of the ordered sequence.

* * * * *